(12) United States Patent
Shringi et al.

(10) Patent No.: US 11,943,307 B1
(45) Date of Patent: Mar. 26, 2024

(54) GENERATING A MODIFIED WEB FARM FRAMEWORK FOR ROUTING WEB TRAFFIC BASED ON SIMILARITIES BETWEEN WEB TRAFFIC REQUESTS

(71) Applicant: Bank of America Corporation, Charlotte, NC (US)

(72) Inventors: Dheeraj Shringi, Charlotte, NC (US); Michael Hester, Lawrence Township, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/072,777

(22) Filed: Dec. 1, 2022

(51) Int. Cl.
  G06F 15/16 (2006.01)
  H04L 67/1008 (2022.01)
  H04L 67/141 (2022.01)
  H04L 67/146 (2022.01)

(52) U.S. Cl.
  CPC ........ H04L 67/141 (2013.01); H04L 67/1008 (2013.01); H04L 67/146 (2013.01)

(58) Field of Classification Search
  None
  See application file for complete search history.

(56) References Cited

U.S. PATENT DOCUMENTS

| | | | |
|---|---|---|---|
| 7,519,699 B2 | 4/2009 | Jain et al. | |
| 7,562,133 B2 | 7/2009 | Jain et al. | |
| 8,589,555 B2 | 11/2013 | Chen et al. | |
| 9,531,796 B2 * | 12/2016 | Desai | H04L 67/1029 |
| 10,412,157 B2 | 9/2019 | Thirumurthi et al. | |
| 11,245,753 B2 * | 2/2022 | Buytenhek | H04L 45/66 |
| 2019/0158408 A1 | 5/2019 | Li et al. | |

FOREIGN PATENT DOCUMENTS

EP 3348038 B1 9/2021

OTHER PUBLICATIONS

Aug. 10, 2023—U.S. Notice of Allowance—U.S. Appl. No. 18/072,781.
Apr. 27, 2023—U.S. Ex Parte Quayle Office Action—U.S. Appl. No. 18/072,781.

* cited by examiner

Primary Examiner — Wing F Chan
Assistant Examiner — Andrew Woo
(74) Attorney, Agent, or Firm — Banner & Witcoff, Ltd.

(57) ABSTRACT

Aspects of the disclosure relate to generating a modified web farm framework for routing web traffic based on similarities between web traffic requests. A computing platform may receive a request to establish a server connection to host a virtual workspace. The computing platform may identify a pod and a server within the pod with network capacity to host the virtual workspace. The computing platform may assign the virtual workspace to the pod and the server, and may generate a cookie indicating connection details associated with the virtual workspace. The computing platform may receive a consumer request to connect to the virtual workspace and may transmit the cookie to the consumer. The computing platform may monitor and analyze the server connection, and may modify the server assignment associated with the virtual workspace based on determining the server connection was lost and/or terminated.

19 Claims, 9 Drawing Sheets

GENERATING A MODIFIED WEB FARM FRAMEWORK FOR ROUTING WEB TRAFFIC BASED ON SIMILARITIES BETWEEN WEB TRAFFIC REQUESTS

BACKGROUND

Aspects of the disclosure relate to hardware and/or software for generating a modified web farm framework for routing web traffic based on similarities between web traffic requests. In particular, one or more aspects of the disclosure relate to establishing a virtual workspace within which an enterprise organization computing device and a consumer computing device may collaborate, identifying and assigning a server pod and a web server to host the virtual workspace, and routing consumer requests to access the virtual workspace to the server pod and the web server assigned to host the virtual workspace.

Current web traffic routing protocols permit a plurality of computing devices to communicate (e.g., via a shared, virtual workspace, or the like) based on establishing at least one connection to at least one web server. Each computing device may establish a network connection to a web server based on information associated with the computing device (e.g., a geographic location of the computing device, a network address associated with the computing device, the computing device's proximity to a data center, or the like). In some instances, the plurality of computing devices may establish network connections to different web servers, wherein the web servers may be located in different data centers. To facilitate communication between the web servers, and ultimately between the computing devices connected to the web servers, the web traffic transmitted from a computing device to a web server may be routed through a backplane.

The backplane may receive web traffic from a first computing device, determine a second computing device to which the web traffic should be routed, and route the web traffic to the second computing device. However, routing web traffic from the plurality of web servers through a single backplane may increase network latency, thereby causing a transmission delay of the web traffic. Therefore, current web traffic routing protocols might not offer web traffic routing methods that reduce network latency, identify similarities between a plurality of web traffic requests generated by the plurality of computing devices, and/or assign similar web traffic requests to particular web servers such that communication between the computing devices is routed through a common web server.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with generating a modified web farm framework for routing web traffic based on similarities between web traffic requests.

In accordance with one or more embodiments, a method may comprise, at a computing device including one or more processors and memory, receiving, from an enterprise organization computing device, a request to establish a server connection to host a virtual workspace. The method may comprise identifying a first web server, of a plurality of web servers, to host the server connection. The method may comprise transmitting the server connection request to the first web server. The method may comprise establishing the server connection between the enterprise organization computing device and the first web server, wherein the establishing the server connection establishes the virtual workspace. The method may comprise generating a cookie containing details that describe the server connection. The method may comprise receiving, from a consumer computing device, a request to access the virtual workspace. The method may comprise establishing at least one additional server connection between the consumer computing device and the first web server based on the details within the cookie. The method may comprise receiving, from the first web server, a notification indicating the enterprise organization computing device lost network connection to the first web server. The method may comprise querying the plurality of web servers to identify a second web server to host the server connection. The method may comprise determining, based on parsing the cookie, whether the details within the cookie identify the second web server as the host of the server connection. The method may comprise, based on determining the details within the cookie do not identify the second web server as the host of the server connection, determining whether the enterprise organization computing device is authorized to modify a host web server. The method may comprise, based on determining the enterprise organization computing device is authorized to modify the host web server, updating the details within the cookie. The method may comprise transmitting an updated cookie to the consumer computing device.

In accordance with one or more embodiments, a computing platform may comprise at least one processor, a communication interface communicatively coupled to the at least one processor, and memory storing computer-readable instructions that, when executed by the at least one processor, cause the computing platform to receive, from an enterprise organization computing device, a request to establish a server connection to host a virtual workspace. The computing platform may identify a first web server, of a plurality of web servers, to host the server connection. The computing platform may transmit the server connection request to the first web server. The computing platform may establish the server connection between the enterprise organization computing device and the first web server, wherein the establishing the server connection establishes the virtual workspace. The computing platform may generate a cookie containing details that describe the server connection. The computing platform may receive, from a consumer computing device, a request to access the virtual workspace. The computing platform may establish at least one additional server connection between the consumer computing device and the first web server based on the details within the cookie. The computing platform may receive, from the first web server, a notification indicating the enterprise organization computing device lost network connection to the first web server. The computing platform may query the plurality of web servers to identify a second web server to host the server connection. The computing platform may determine, based on parsing the cookie, whether the details within the cookie identify the second web server as the host of the server connection. The computing platform may, based on determining the details within the cookie do not identify the second web server as the host of the server connection, determine whether the enterprise organization computing device is authorized to modify a host web server. The computing platform may, based on determining the enterprise organization computing device is authorized to modify the host web server, update the details within the cookie. The computing platform may transmit an updated cookie to the consumer computing device.

In accordance with one or more embodiments, one or more non-transitory computer-readable media storing instructions that, when executed by a computing platform comprising at least one processor, memory, and a communication interface, cause the computing platform to receive, from an enterprise organization computing device, a request to establish a server connection to host a virtual workspace. The instructions, when executed, may cause the computing platform to identify a first web server, of a plurality of web servers, to host the server connection. The instructions, when executed, may cause the computing platform to transmit the server connection request to the first web server. The instructions, when executed, may cause the computing platform to establish the server connection between the enterprise organization computing device and the first web server, wherein the establishing the server connection establishes the virtual workspace. The instructions, when executed, may cause the computing platform to generate a cookie containing details that describe the server connection. The instructions, when executed, may cause the computing platform to receive, from a consumer computing device, a request to access the virtual workspace. The instructions, when executed, may cause the computing platform to establish at least one additional server connection between the consumer computing device and the first web server based on the details within the cookie. The instructions, when executed, may cause the computing platform to receive, from the first web server, a notification indicating the enterprise organization computing device lost network connection to the first web server. The instructions, when executed, may cause the computing platform to query the plurality of web servers to identify a second web server to host the server connection. The instructions, when executed, may cause the computing platform to determine, based on parsing the cookie, whether the details within the cookie identify the second web server as the host of the server connection. The instructions, when executed, may cause the computing platform to, based on determining the details within the cookie do not identify the second web server as the host of the server connection, determine whether the enterprise organization computing device is authorized to modify a host web server. The instructions, when executed, may cause the computing platform to, based on determining the enterprise organization computing device is authorized to modify the host web server, update the details within the cookie. The instructions, when executed, may cause the computing platform to transmit an updated cookie to the consumer computing device.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
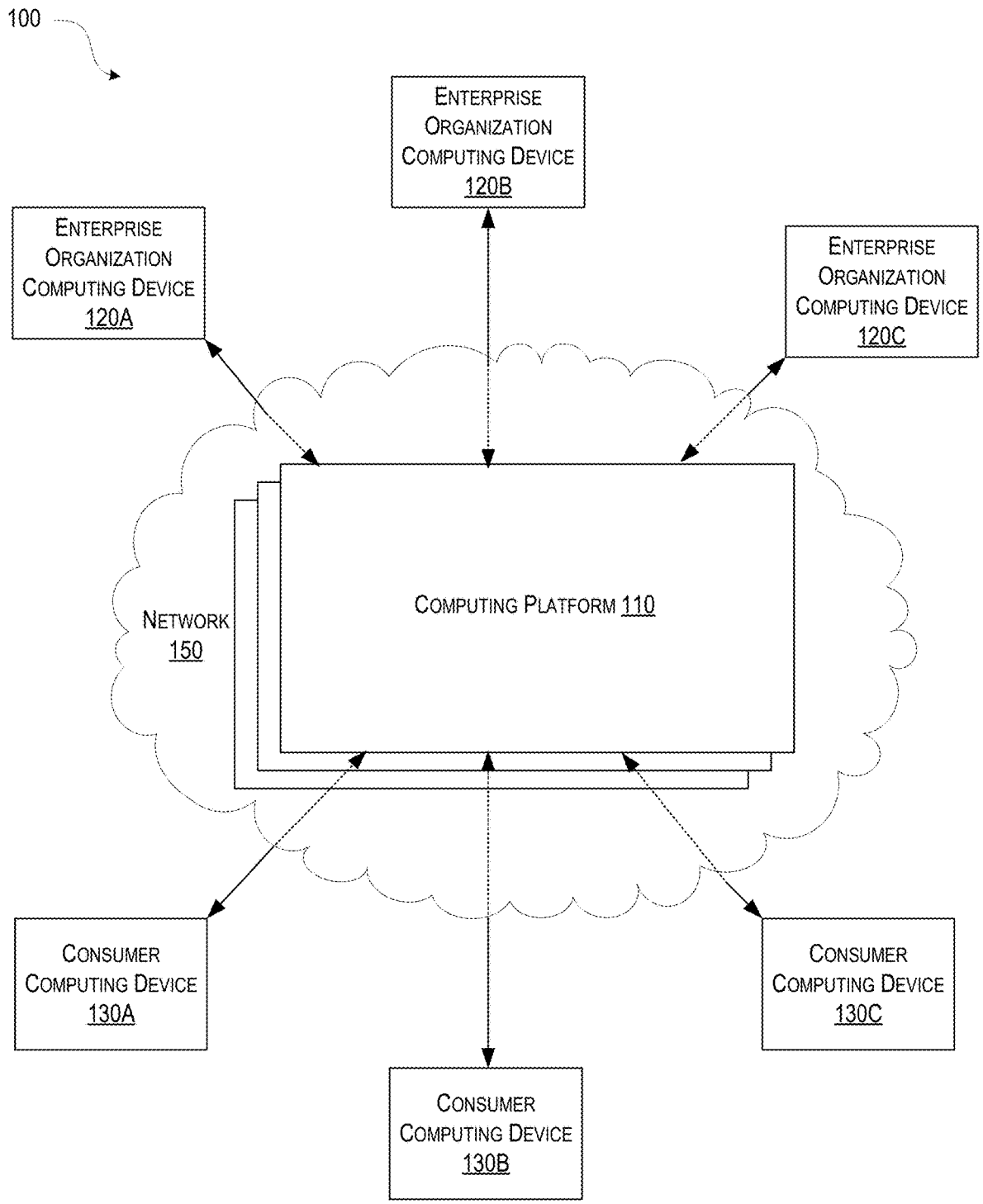
FIG. 1A depicts an illustrative example of a computer system for generating a modified web farm framework for routing web traffic based on similarities between the web traffic requests, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

In some arrangements, current web traffic routing protocols might not offer web traffic routing methods that reduce network latency, identify similarities between a plurality of web traffic requests generated by the plurality of computing devices, and/or assign similar web traffic requests to particular web servers such that communication between the computing devices is routed through a common web server. Accordingly, proposed herein is a solution to the problem described above that includes generating a modified web farm framework for routing web traffic based on similarities between web traffic requests. For example, a computing platform may receive a request from an enterprise organization computing device to establish a server connection to host a web-based, collaborative work environment (e.g., a virtual workspace). The computing platform may monitor a volume of web traffic associated with a plurality of web servers, wherein the plurality of web servers may be divided into server pods and each server pod may comprise a subset of the plurality of web servers. The computing platform may identify, based on the monitoring, a web server associated with the lowest volume of web traffic and may assign the identified web server and the corresponding server pod to host the virtual workspace. The computing platform may generate and store a cookie comprising details and/or instructions for accessing the virtual workspace.

Based on receiving a request from a consumer computing device to access the virtual workspace, the computing platform may transmit the cookie to the consumer computing device and may establish a network connection between the consumer computing device and the virtual workspace. The computing platform may monitor the virtual workspace to determine whether the enterprise organization computing device is connected to the virtual workspace. Based on determining the enterprise organization computing device lost the network connection to the virtual workspace, the computing platform may determine whether to resume the server connection with the enterprise organization computing device and the virtual workspace, or to identify a second web server with network availability to host the virtual workspace. Based on determining the enterprise organization computing device terminated access to the virtual workspace, the computing platform may deactivate the virtual workspace (e.g., soft delete the virtual workspace from the network) and may transmit a notification to the consumer computing device indicating termination of access to the virtual workspace. Alternatively, based on determining the enterprise organization computing device is present within the virtual workspace, then computing platform may maintain the network connections to the virtual workspace.

In further arrangements, current web traffic routing procedures might not permit computing devices to identify a particular web server with which additional computing devices may be associated, transmit a request to establish a network connection with the particular web server, and/or collaborate in real-time or near real-time with the additional computing devices within a virtual workspace hosted by the particular web server. Accordingly, proposed herein is a solution to the problem described above that includes accessing and interacting with requested web content using a modified web farm framework. For example, a computing platform may receive, from a consumer computing device, a request to access a virtual workspace. The computing platform may parse a log of virtual workspaces that are currently active within the network to locate a cookie associated with the requested virtual workspace, wherein the cookie may comprise details and instructions for connecting to a server pod and a web server that host the virtual workspace. The computing platform may transmit a copy of the cookie to the consumer computing device and may receive, from the consumer computing device, a request to establish a network connection with the server pod and the web server assigned to host the virtual workspace.

Based on determining the consumer computing device lost access to the virtual workspace, the computing platform may determine whether the cookie that corresponds to the virtual workspace was updated. The computing platform may transmit a copy of the updated cookie to the consumer computing device and may receive, from the consumer computing device, a request to re-connect to the virtual workspace based on the updated connection details within the updated cookie. Based on determining an enterprise organization computing device associated with the virtual workspace terminated access to the virtual workspace, the computing platform may transmit a notification to the consumer computing device indicating termination of access to the virtual workspace.

Computer Architecture

FIG. 1A depicts an illustrative example of a computer system 100 that may be used for generating, in real-time or near real-time, a modified web farm framework for routing web traffic based on similarities between web traffic requests, in accordance with one or more aspects described herein. Computer system 100 may comprise one or more computing devices including at least computing platform 110, enterprise organization computing devices 120a-120c, and/or consumer computing devices 130a-130c. While FIG. 1A depicts more than one enterprise organization computing device (e.g., enterprise organization computing devices 120a-120c) and/or more than one consumer computing device (e.g., consumer computing devices 130a-130c), each of enterprise organization computing devices 120a-120c and/or consumer computing devices 130a-130c may be configured in accordance with the features described herein.

While the description herein may refer to enterprise organization computing device 120 and/or consumer computing device 130, the functions described herein may also be performed by any one of enterprise organization computing devices 120a-120c and/or consumer computing devices 130a-130c. While FIG. 1A depicts enterprise organization computing devices 120a-120c and consumer computing devices 130a-130c, more or fewer than three enterprise organization computing devices and/or consumer computing devices may exist within computer system 100. Three enterprise organization computing devices and three consumer computing devices are depicted in FIG. 1A for illustration purposes only and are not meant to be limiting.

Enterprise organization computing device 120 may transmit, to computing platform 110, a plurality of web traffic requests (e.g., requests to establish a network connection and/or server connection to host a virtual workspace), and may receive access to the virtual workspace based on the network connection and/or server connection. At least one of enterprise organization computing devices 120a-120c (e.g., enterprise organization computing device 120a) may collaborate with a different one of enterprise organization computing devices 120a-120c (e.g., enterprise organization computing devices 120b-120c) and/or consumer computing devices 130a-130c within the virtual workspace. Enterprise organization computing device 120 may influence whether the network connection and/or server connection to the virtual workspace may remain active (e.g., based on whether at least one of enterprise organization computing devices 120a-120c is present within the virtual workspace, based on whether at least one of enterprise organization computing devices 120a-120c terminates access to the virtual workspace, based on whether at least one of enterprise organization computing devices 120a-120c loses the network connection and/or server connection to the virtual workspace, or the like).

Consumer computing device 130 may also transmit, to computing platform 110, a plurality of web traffic requests (e.g., requests to establish a server connection and/or network connection with a server pod and a web server assigned to host the virtual workspace). Consumer computing device 130 may receive access to the virtual workspace based on the network connection and/or server connection with the web server. At least one of consumer computing devices 130a-130c (e.g., consumer computing device 130a) may collaborate with a different one of consumer computing devices 130a-130c (e.g., consumer computing devices 130b-

130c) and/or enterprise organization computing devices 120a-120c within the virtual workspace. In some instances, consumer computing device 130 may lose the network connection and/or the server connection to the virtual workspace and may either re-connect to the web server assigned to host the virtual workspace or establish a second server connection and/or network connection with a second web server assigned to host the virtual workspace. Consumer computing device 130 may terminate (e.g., intentionally) access to the virtual workspace. In some instances, consumer computing device 130 may receive a notification indicating termination of access to the virtual workspace based on at least one of enterprise organization computing devices 120a-120c terminating access to the virtual workspace.

Each one of enterprise organization computing devices 120a-120c and consumer computing devices 130a-130c may be configured to communicate with computing platform 110 through network 150. Network 150 may include one or more sub-networks (e.g., local area networks (LANs), wide area networks (WANs), or the like). In some arrangements, computer system 100 may include additional computing devices and networks that are not depicted in FIG. 1A, which may also be configured to interact with computing platform 110. Computer system 100 may include a local network configured to interconnect each of the computing devices comprising computing platform 110.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 120, consumer computing device 130, and/or additional computing devices.

Computing platform 110 may receive, from enterprise organization computing device 120, a request to establish a server connection and/or network connection to host the virtual workspace. Computing platform 110 may identify a server pod and a web server with network availability to host the virtual workspace, and may assign the server pod and the web server to host the virtual workspace. Computing platform 110 may monitor the presence (or absence) of at least one of enterprise organization computing devices 120a-120c within the virtual workspace, and may determine whether to deactivate the virtual workspace based on the monitoring. In some instances, computing platform 110 may determine, based on the monitoring, whether to elect a second server pod and/or a second web server to host the virtual workspace. Computing platform 110 may further monitor the performance of network 150, the server pod (or the second server pod), and the web server (or the second web server) assigned to host the virtual workspace. Based on the monitoring, computing platform 110 may determine whether to terminate access to the virtual workspace.

Additionally or alternatively, computing platform 110 may receive, from consumer computing device 130, a request to access the virtual workspace. Computing platform 110 may transmit, to consumer computing device 130, a cookie comprising connection details corresponding to the virtual workspace. Computing platform 110 may establish a server connection and/or network connection between consumer computing device 130 and the virtual workspace, and may monitor the virtual workspace to determine whether to transmit, to consumer computing device 130, a notification indicating termination of access to the virtual workspace.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in a database, for data received from at least one of enterprise organization computing device 120 and/or consumer computing device 130.

In some instances, at least one of enterprise organization computing device 120 and/or consumer computing device 130 may be configured to receive and transmit information through particular channels and/or applications associated with computing platform 110. The requests submitted by at least one of enterprise organization computing device 120 and/or consumer computing device 130 may initiate the performance of particular computational functions at computing platform 110, such as the analysis of at least one enterprise organization computing device request to establish a virtual workspace and/or at least one consumer computing device request to access the virtual workspace.

Figure 1B:
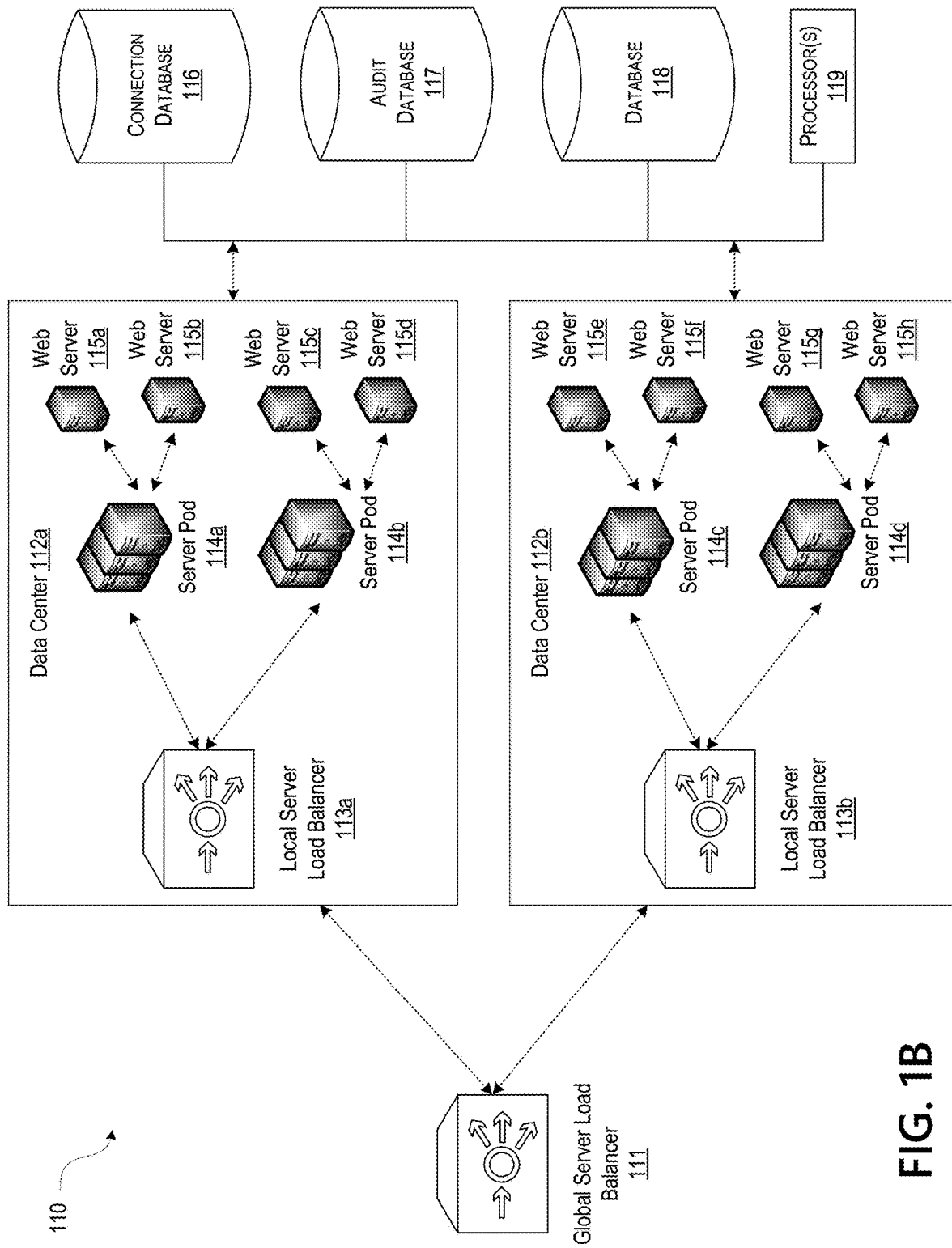
FIG. 1B depicts an illustrative example of the computing platform that may be used for generating a modified web farm framework for routing web traffic based on similarities between the web traffic requests, in accordance with one or more example embodiments.

FIG. 1B depicts the components of computing platform 110 that may be used for generating, in real-time or near real-time, a modified web farm framework for routing web traffic based on similarities between web traffic requests, in accordance with one or more aspects described herein. Computing platform 110 may comprise global server load balancer 111, data centers 112a-112b, local server load balancers 113a-113b, server pods 114a-114d, web servers 115a-115h, connection database 116, audit database 117, database 118, and/or processor(s) 119. While FIG. 1B depicts data centers 112a-112b, local server load balancers 113a-113b, server pods 114a-114d, and web servers 115a-115h, more or fewer data centers, local server load balancers, server pods, and web servers may exist within computer system 100. Data centers 112a-112b, local server load balancers 113a-113b, server pods 114a-114d, and web servers 115a-115h are depicted in FIG. 1B for illustration purposes only and are not meant to be limiting.

Each computing device within computing platform 110 may contain database 118 and processor(s) 119, which may be stored in memory of the one or more computing devices of computing platform 110. Through execution of computer-readable instructions stored in memory, the computing devices of computing platform 110 may be configured to perform functions of the centralized entity and store the data generated during the performance of such functions in database 118.

The computing devices within computing platform 110 may work together to generate a modified web farm framework. A web farm framework may comprise a data routing protocol wherein communication between a plurality of computing devices may be routed to at least one web server of a plurality of web servers. To do so, the web farm framework may use a backplane to facilitate communication between the plurality of web servers. In particular, the backplane may receive a volume of communication (e.g., messages, or the like) to be transmitted between at least two computing devices, parse each received communication, identify at least one recipient web server, and transmit the received communication(s) to the at least one recipient web server.

However, a modified web farm framework may be configured to facilitate communication between the plurality of computing devices using a plurality of web server clusters (e.g., server pods) and/or a plurality of load balancers in place of the backplane. The modified web farm framework may determine an overall network processing capacity and/or a current processing capacity for each server pod and/or each web server therein. The modified web farm framework may use the determined processing capacities to assign at least one virtual workspace to a particular server pod and a particular web server. Based on receiving a web request to establish the virtual workspace (e.g., from enterprise organization computing device 120, or the like), the modified web farm framework may elect the server pod and the web server with the greatest current processing capacity to host the virtual workspace. Based on receiving a web request to access the virtual workspace (e.g., from consumer computing device 130, or the like), the modified web farm framework may route consumer computing device 130 to the server pod and the web server assigned to host the virtual workspace.

Global server load balancer 111 may receive, from enterprise organization computing device 120, a request to establish a server connection and/or network connection to host the virtual workspace. In some instances, global server load balancer 111 may receive, from consumer computing device 130, a request to access the virtual workspace. Global server load balancer 111 may compare a current processing availability associated with data centers 112a-112b to identify a data center that may host the virtual workspace. In some instances, global server load balancer 111 may use the current processing availability associated with data centers 112a-112b to identify a data center that may handle the consumer computing device request to access the virtual workspace. Global server load balancer 111 may transmit the enterprise organization computing device request and/or the consumer computing device request to the identified data center.

Data centers 112a-112b may receive, from global server load balancer 111, at least one of the enterprise organization computing device request and/or the consumer computing device request. Data centers 112a-112b may further process the received request using at least one of local server load balancers 113a-113b, server pods 114a-114d, and/or web servers 115a-115h.

Local server load balancers 113a-113b may parse the at least one request received by data centers 112a-112b. Local server load balancers 113a-113b may also determine a current processing availability associated with each of server pods 114a-114d and/or web servers 115a-115h. Local server load balancers 113a-113b may use the current processing availabilities to identify at least one of server pods 114a-114d and/or web servers 115a-115h with processing availability to host the virtual workspace. In some instances, load server load balancers 113a-113b may transmit the at least one request to at least one of server pods 114a-114d and/or web servers 115a-115h.

Server pods 114a-114d may comprise clusters of web servers 115a-115h, wherein each cluster may correspond to a subset of web servers 115a-115h. Server pods 114a-114d may receive, from local server load balancers 113a-113b, the at least one request. In some instances, server pods 114a-114d may also receive, from local server load balancers 113a-113b, an indication of at least one of web servers 115a-115h that may have processing availability to host the virtual workspace. Server pods 114a-114d may transmit the enterprise organization computing device request and/or the consumer computing device request to at least one of web servers 115a-115h.

Web servers 115a-115h may receive, from server pods 114a-114d, the enterprise organization computing device request and/or the consumer computing device request. Based on parsing the enterprise organization computing device request and/or the consumer computing device request, web servers 115a-115h may establish a plurality of server connections and/or network connections between the virtual workspace and at least one of enterprise organization computing devices 120a-120c and/or consumer computing devices 130a-130c. Web servers 115a-115h may monitor the plurality of server connections and/or network connections and may determine, based on the monitoring, whether at least one server connection and/or network connection should be modified (e.g., terminated, hosted by a different web server, or the like).

Figure 2A:
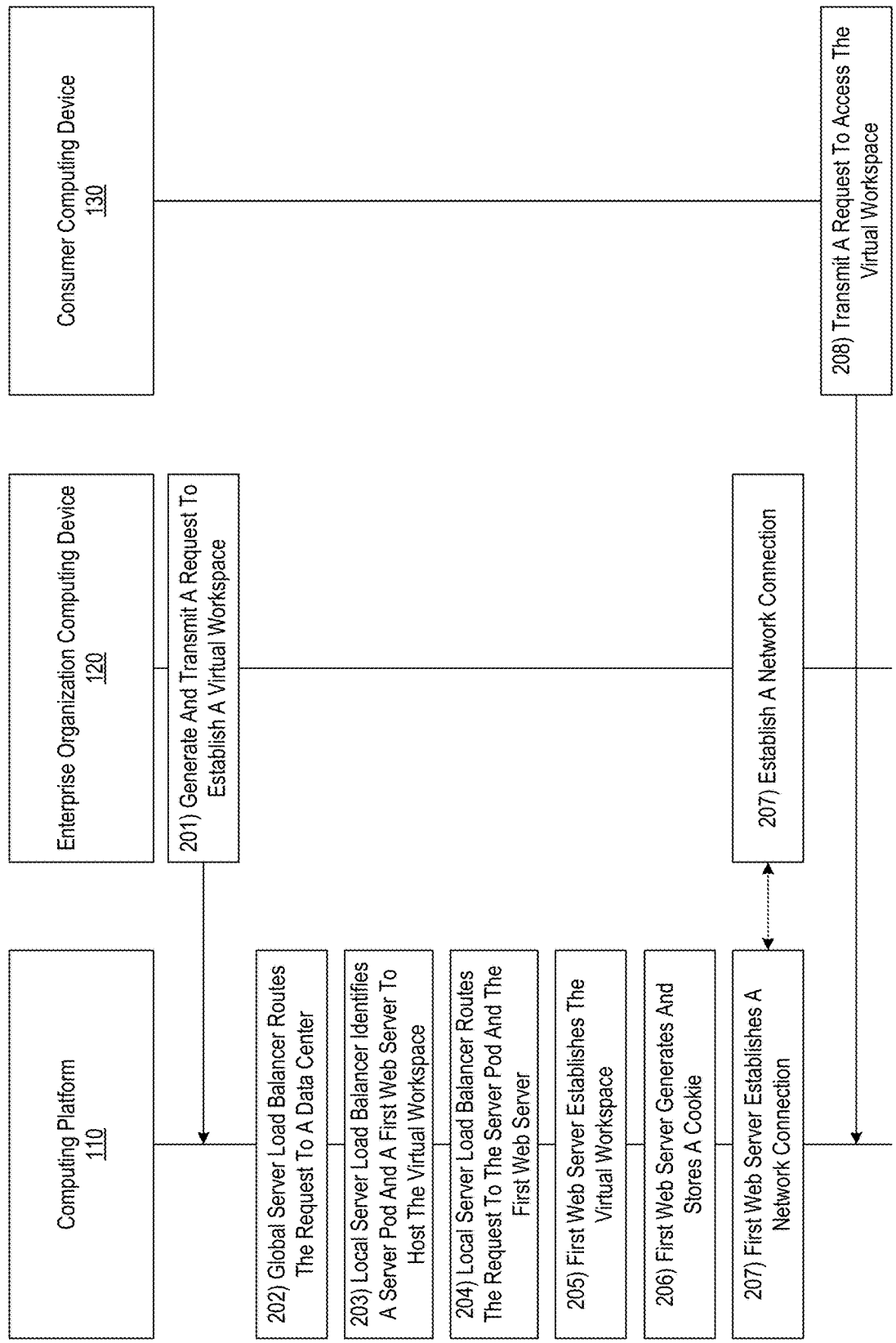
FIG. 2A-2C depict an illustrative event sequence for generating a modified web farm framework for routing web traffic based on similarities between the web traffic requests, in accordance with one or more example embodiments.
Figure 2B:
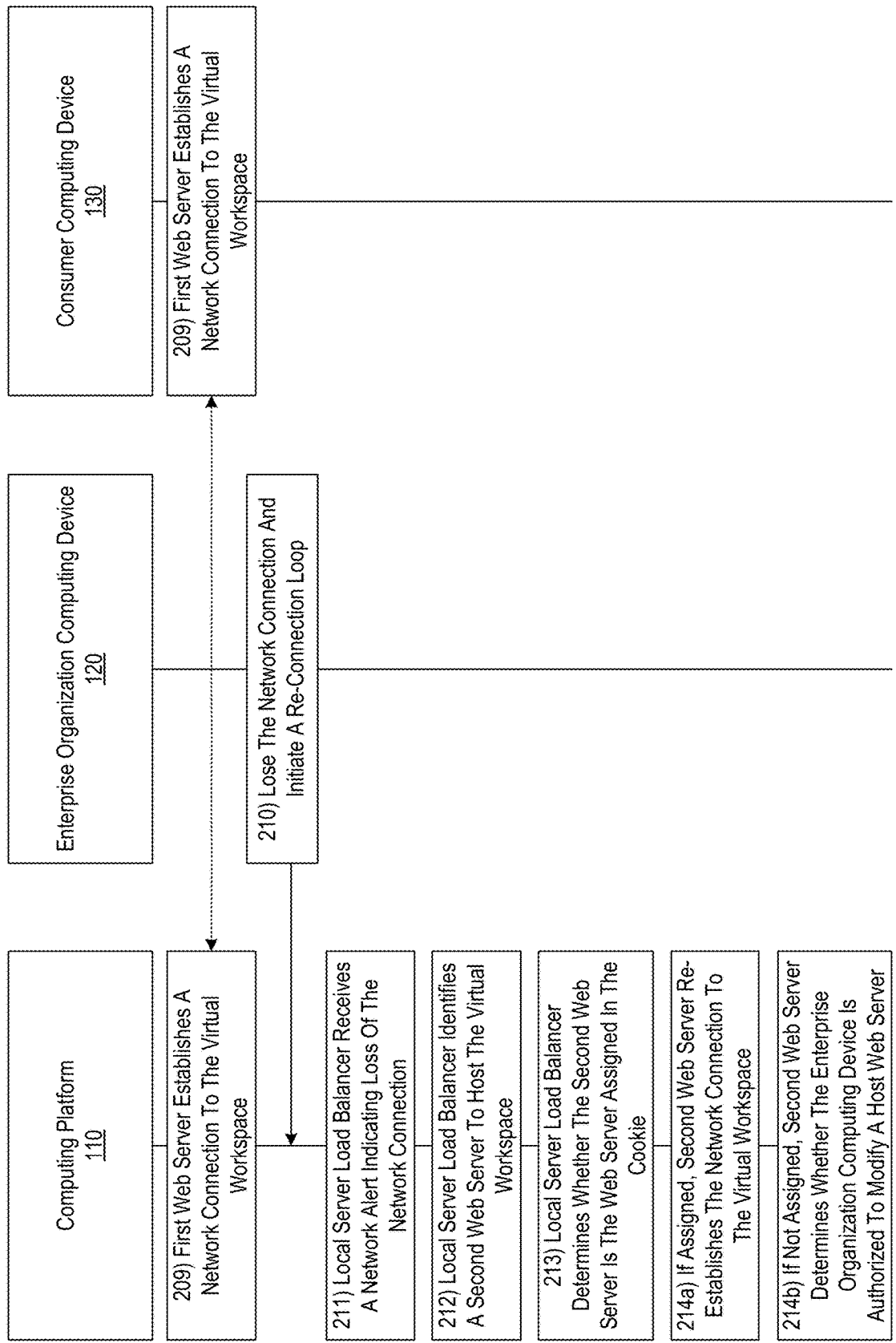
Figure 2C:
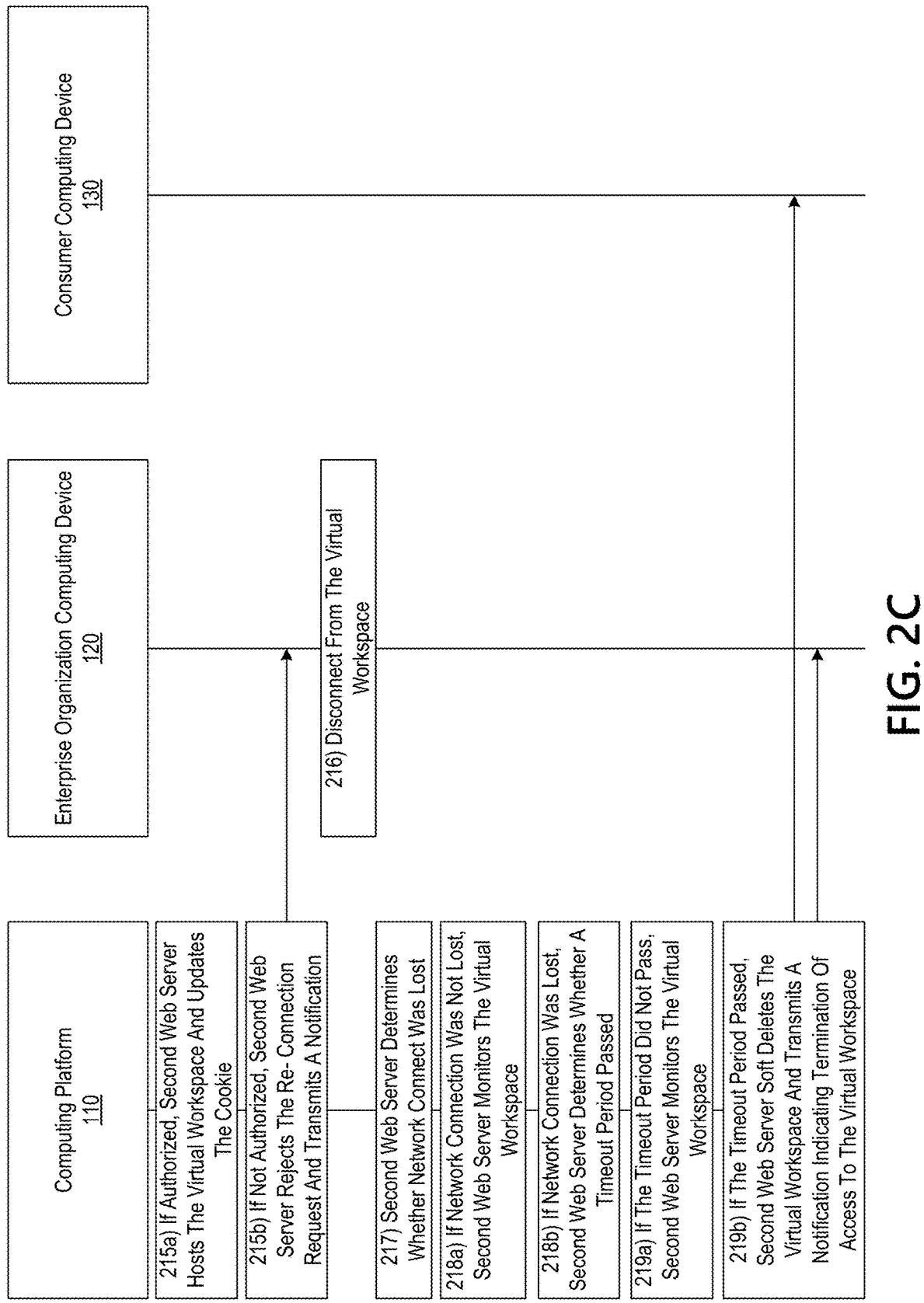

Generating a Modified Web Farm Framework for Routing Web Traffic Based on Similarities Between Web Traffic Requests/Accessing and Interacting with Requested Web Content Using a Modified Web Farm Framework FIGS. 2A-2C depict an illustrative event sequence for generating, in real-time or near real-time, a modified web farm framework for routing web traffic based on similarities between the web traffic requests, in accordance with one or more aspects described herein. While aspects described with respect to FIGS. 2A-2C include the evaluation of a single enterprise organization computing device request (e.g., a request to establish a server connection and/or network connection to host a virtual workspace, or the like), a plurality of enterprise organization computing device requests may be received and evaluated (e.g., in parallel) without departing from the present disclosure. One or more processes performed in FIGS. 2A-2C may be performed in real-time or near real-time and one or more steps or processes may be added, omitted, or performed in a different order, without departing from the present disclosure.

Referring to FIG. 2A, at step 201, enterprise organization computing device 120 may generate a request to establish a server connection and/or network connection to host a virtual workspace. A virtual workspace may correspond to a web-based environment (e.g., an enterprise organization webpage, an enterprise organization web portal, a consumer portal associated with an enterprise organization, or the like) within which enterprise organization computing device 120 may collaborate with at least one additional computing device (e.g., consumer computing device 130, or the like). The server connection and/or network connection associated with virtual workspace may identify a server pod (e.g., a cluster of web servers with a web farm framework, or the like) and a web server within the server pod with network availability to host the virtual workspace. In some instances, the request to establish the server connection and/or network connection may comprise a unique identifier associated with the virtual workspace (e.g., a webpage address that corresponds to the enterprise organization webpage, an Internet address that corresponds to the enterprise organization web portal, an Internet address that corresponds to the consumer portal, or the like). Enterprise organization computing device 120 may transmit the request to global server load balancer 111 of computing platform 110.

At step 202, computing platform 110 (e.g., via global server load balancer 111) may receive the request from enterprise organization computing device 120 and may parse the request to identify a data center (e.g., one of data centers 112a-112b, or the like) that may have network availability to host the server connection and/or network connection to the virtual workspace. The data center may comprise at least one local server load balancer (e.g., one of local server load balancers 113a-113b, or the like), at least one server pod (e.g., at least one of server pods 114a-114d, or the like), and/or at least one web server (e.g., one of web servers 115a-115h, or the like). Computing platform 110 (e.g., via global server load balancer 111) may consider the network availability of server pods 114a-114d and/or web servers 115a-115h to determine the network availability of data centers 112a-112b. Computing platform 110 (e.g., via global server load balancer 111) may compare the network availability of each data center (e.g., data centers 112a-112b, or the like) and may identify a data center that may host the server connection and/or network connection to the virtual workspace (e.g., a data center with the greatest network availability, or the like). Based on determining data center 112a may have network availability to host the virtual workspace (e.g., may have the greatest network availability to host the server connection and/or network connection to the virtual workspace, or the like), computing platform 110 (e.g., via global server load balancer 111) may route the request to data center 112a.

At step 203, computing platform 110 may identify a server pod (e.g., at least one of server pods 114a-114b of data center 112a, or the like), and/or a web server (e.g., at least one of web servers 115a-115d of data center 112a, or the like) that may host the virtual workspace. To do so, computing platform 110 (e.g., via local server load balancer 113a) may determine a network capacity and a network availability of each sever pod and each web server therein. The network capacity may indicate a maximum operational functionality of each server pod and each web server based on a volume of network traffic that each server pod and each web server may receive (e.g., an operational functionality measure beyond which the server pod and/or web server might not have sufficient network processing resources to host the virtual workspace, a maximum volume of network traffic that each server pod may handle, a maximum volume of network traffic that each web server may handle, or the like). The network availability may indicate a current measure of the operational functionality of each server pod and each web server (e.g., a difference between the maximum volume of network traffic associated with each server pod and a current volume of network traffic associated with each server pod, a difference between the maximum volume of network traffic associated with each web server and a current volume of network traffic associated with each web server, or the like).

Computing platform 110 (e.g., via local server load balancer 113a) may compare the network capacity (e.g., the maximum volume of network traffic, or the like) of each server pod to the network availability (e.g., the difference between the maximum volume of network traffic and the current volume of network traffic, or the like) of each server pod to identify a server pod (e.g., server pod 114a, or the like) with the greatest network availability to host the virtual workspace (e.g., a server pod associated with the least volume of current network traffic, or the like). Based on determining server pod 114a may be associated with the greatest network availability to host the virtual workspace, computing platform 110 (e.g., via local server load balancer 113a) may compare the network capacity (e.g., the maximum volume of network traffic, or the like) of each web server therein to the network availability (e.g., the difference between the maximum volume of network traffic and the current volume of network traffic, or the like) of each web server therein to identify the web server (e.g., web server 115a, or the like) with the greatest network availability to host the virtual workspace.

In some instances, computing platform 110 (e.g., via local server load balancer 113a) may determine that more than one server pod and/or web server may have network availability to host the virtual workspace and, as such, may elect the server pod and the web server to host the virtual workspace based on considering criteria received from the enterprise organization (e.g., a processing history of each server pod, a processing history each web server, or the like). Additionally or alternatively, computing platform 110 (e.g., via local server load balancer 113a) may determine that the server pods and/or the web servers associated with local server load balancer 113a might not have network availability to host the virtual workspace and, as such, may transmit a notification to global server load balancer 111. The notification may request that a different local server load balancer (e.g., local server load balancer 113b, or the like) handle the request from enterprise organization computing device 120.

At step 204, computing platform 110 (e.g., via local server load balancer 113a) may route the request to the identified web server (e.g., web server 115a, or the like) associated with the identified server pod with network availability to host the virtual workspace (e.g., server pod 114a, or the like).

At step 205, computing platform 110 may establish the server connection and/or network connection to the virtual workspace. To do so, computing platform 110 (e.g., via web server 115a) may parse the request to extract at least one unique identifier associated with the virtual workspace (e.g., a workspaceID, a webpage address that corresponds to the enterprise organization webpage, an Internet address that corresponds to the enterprise organization web portal, an Internet address that corresponds to the consumer portal, or the like). Computing platform 110 (e.g., via web server 115a) may use the at least one unique identifier to launch the virtual workspace. To launch the virtual workspace, computing platform 110 (e.g., via web server 115a) may assign a unique network address to the virtual workspace (e.g., an IP address, an Internet address, or the like) such that the virtual workspace may be located within network 150. Computing platform 110 (e.g., via web server 115a) may also publish the virtual workspace such that the unique network address associated with the virtual workspace may be identified by at least one computing device within computing platform 110 (e.g., thereby allowing the at least one computing device within computing platform 110 to locate and/or request access to the virtual workspace within network 150, or the like).

Computing platform 110 (e.g., via web server 115a) may store, within connection database 116, the at least one unique identifier and/or unique network address associated with the virtual workspace. Connection database 116 may comprise connection details associated with the virtual workspace (e.g., unique identifier that may be used to identify the virtual workspace, unique identifiers that may be used to launch the virtual workspace, unique identifiers that correspond to the server pod and the web server therein that may host the virtual workspace, a unique identifier that corresponds to the local server load balancer that hosts the server pod and the web server therein, or the like). The data within connection database 116 may be stored dynamically, such that the data may be modified based on at least one change to the server connection and/or network connection to the virtual workspace (e.g., based on determining at least one of the server pod and/or the web server assignment should be changed to a different server pod and/or different web server, or the like).

Access to connection database 116 may differ depending on the computing device that is requesting access (e.g., a hierarchy of accessibility). Web servers 115a-115h may be associated with a first level of accessibility (e.g., a least restrictive level of accessibility). Web servers 115a-115h may perform functions on the data stored within connection database 116 (e.g., access the data, add data, remove data, modify data, or the like). The remaining computing devices within computing platform 110 may be associated with a second level of accessibility (e.g., a more restrictive level of accessibility than the first level of accessibility). The remaining computing devices within computing platform 110 may access the data stored within connection database 116, but might not be permitted to add, remove, and/or modify the data stored within connection database 116.

Furthermore, computing platform 110 (e.g., via web server 115a) may store, within audit database 117, the workspaceID that corresponds the virtual workspace. The workspaceID may correspond to a unique identifier that describes the virtual workspace (e.g., an enterprise organization number associated with the virtual workspace, an enterprise organization curated name associated with the virtual workspace, or the like). The workspaceID might not be repeated and/or shared among a plurality of virtual workspaces (e.g., each workspaceID may be used once and may correspond to a single virtual workspace, or the like). Audit database 117 may comprise a log of each virtual workspace established by each of web servers 115a-115h (e.g., virtual workspaces that might not be accessible to computing devices, virtual workspaces to which an enterprise organization computing device terminated access, virtual workspaces to which a consumer computing device terminated access, virtual workspaces that may be accessible to all computing devices, or the like). The data within audit database 117 may comprise static data (e.g., the data might not change dynamically to mirror modifications to the server connection and/or network connection to the virtual workspace, or the like).

Access to audit database 117 may differ depending on the computing device that is requesting access (e.g., a hierarchy of accessibility). Web servers 115a-115h may be associated with a first level of accessibility (e.g., a least restrictive level of accessibility). Web servers 115a-115h may perform functions on the data stored within audit database 117 (e.g., access the data, add data, or the like). The remaining computing devices within computing platform 110 may be associated with a second level of accessibility (e.g., a more restrictive level of accessibility than the first level of accessibility). The remaining computing devices within computing platform 110 may access the data stored within audit database 117, but might not be permitted to add data to audit database 117.

At step 206, computing platform 110 (e.g., via web server 115a) may generate a cookie comprising server and/or network connection details that correspond to the virtual workspace. The cookie may indicate the server pod and the web server to which local server load balancer 113a may assign the virtual workspace. The connection details within the cookie may comprise a unique identifier that corresponds to the local server load balancer (e.g., local server load balancer 113a, or the like) that may host the server pod and the web server assigned to host the virtual workspace, a unique identifier that corresponds to the server pod assigned to host the virtual workspace, a unique identifier that corresponds to the web server assigned to host the virtual workspace, a network address that corresponds to the virtual workspace, or the like. As discussed in detail below, the details within the cookie may be used to identify the network location of the virtual workspace and/or to identify the server pod and the web server that may receive subsequent requests (e.g., from consumer computing devices 130a-130c, or the like) to connect to the virtual workspace. Web server 115a may store the cookie within connection database 116.

At step 207, computing platform 110 (e.g., via web server 115a) may establish a server connection and/or network connection to the virtual workspace and may share the server connection and/or network connection with enterprise organization computing device 120. To do so, computing platform 110 (e.g., via web server 115a) may parse connection database 116 to identify a network address associated with the virtual workspace. In some instances, computing platform 110 (e.g., via web server 115a) may transmit, to enterprise organization computing device 120, the network address such that enterprise organization computing device 120 may access the virtual workspace at a time in the future. Additionally or alternatively, transmitting the network address to enterprise organization computing device 120 may cause the virtual workspace to be displayed via a display device on enterprise organization computing device 120. As such, enterprise organization computing device 120 may use the virtual workspace to collaborate with at least one additional computing device (e.g., at least a different one of enterprise organization computing devices 120a-120c, consumer computing devices 130a-130c, or the like).

At step 208, consumer computing device 130 may transmit, to computing platform 110 (e.g., to global server load balancer 111), a request to access the virtual workspace. The consumer request may comprise at least one unique identifier associated with the virtual workspace (e.g., a workspaceID, a webpage address that corresponds to the enterprise organization webpage, an Internet address that corresponds to the enterprise organization web portal, an Internet address that corresponds to the consumer portal, or the like).

Referring to FIG. 2B, at step 209, computing platform 110 (e.g., via web server 115a) may establish a server connection and/or network connection between the virtual workspace and consumer computing device 130. As discussed in detail in connection with FIGS. 3A-3B, computing platform 110 (e.g., via global server load balancer 111) may receive and parse the consumer request. Based on parsing the consumer request, global server load balancer 111 may identify a unique identifier that corresponds to the virtual workspace and may use the unique identifier to parse connection database 116. Global server load balancer 111 may identify, within connection database 116, the cookie comprising the connection details associated with the virtual workspace and may transmit the consumer request to the web server indicated in the cookie (e.g., web server 115a, or the like).

Computing platform 110 (e.g., via web server 115a) may receive the consumer request from global server load balancer 111, and may parse the consumer request and connection database 116 to gather further details associated with the virtual workspace (e.g., the network address that corresponds to the virtual workspace, or the like). Web server 115*a* may use the details to establish a server connection and/or network connection between the virtual workspace and consumer computing device 130. To do so, web server 115*a* may transmit the network address to consumer computing device 130 and, in some instances, may cause the virtual workspace to be displayed via a display device on consumer computing device 130. As such, consumer computing device 130 may use the virtual workspace to collaborate with at least one additional computing device (e.g., at least one of enterprise organization computing devices 120*a*-120*c*, a different one of consumer computing devices 130*a*-130*c*, or the like).

At step 210, enterprise organization computing device 120 may lose the server connection and/or network connection to the virtual workspace and may initiate a re-connection loop to access the virtual workspace. In some instances, the loss of the server connection and/or network connection may be caused by a glitch within network 150 (e.g., a webpage timeout, a web browser timeout, or the like). Additionally or alternatively, the loss of the server connection and/or network connection may be based on reduced functionality of the web server that hosts the virtual workspace based on software and/or hardware complications (e.g., reduced functionality of web server 115*a*, loss of power to web server 115*a* which may result in loss of functionality of web server 115*a*, or the like). The re-connection loop may comprise of a plurality of steps that, when executed, may re-establish the server connection and/or network connection to the virtual workspace, as discussed in detail below. To initiate the re-connection loop, enterprise organization computing device 120 may transmit, to computing platform 110, a re-connection request (e.g., a request to re-establish the server connection and/or network connection to the virtual workspace, or the like).

At step 211, computing platform 110 (e.g., local server load balancer 113*a* associated with the server pod and the web server that host the virtual workspace, or the like) may receive a network alert (e.g., from network 150, or the like) indicating that enterprise organization computing device 120 lost the server connection and/or network connection to the virtual workspace. Computing platform 110 may continuously identify the computing devices associated with at least one server connection and/or network connection to at least one virtual workspace, and may log the identified computing devices within connection database 116. Based on detecting at least one change in the computing devices associated with the at least one virtual workspace, network 150 may transmit the network alert to the local server load balancer associated with the virtual workspace (e.g., local server load balancer 113*a*). The notification may identify at least one computing device that may have established a connection with (or disconnected from) at least one virtual workspace.

At step 212, the computing platform 110 may identify a server pod (e.g., one of server pods 114*a*-114*d*, or the like) and a web server (e.g., one of web servers 115*a*-115*h*, or the like) that may be used to re-establish the server connection and/or network connection to the virtual workspace. To do so, computing platform 110 (e.g., via local server load balancer 113*a*) may compare the network capacity of each corresponding server pod to the current network availability of each corresponding server pod to identify a second server pod with the greatest network availability to re-establish the server connection and/or network connection to the virtual workspace (e.g., one of server pods 114*a*-114*d*, or the like). In some instances, and based on the comparison, computing platform 110 may determine that the server pod indicated in the cookie (e.g., server pod 114*a*) may comprise network capacity to re-establish the server connection and/or network connection to the virtual workspace. Therefore, in some instances, computing platform 110 may determine, based on the comparison, that the second server pod with the greatest network availability to re-establish the server connection and/or network connection to the virtual workspace may be the server pod assigned to the host the virtual workspace, as indicated in the cookie.

Based on identifying the second server pod that may be associated with the greatest network availability to re-establish the server connection and/or network connection to the virtual workspace, computing platform 110 (e.g., via local server load balancer 113*a*) may compare the network capacity of each web server therein to the current network availability of each web server therein to identify a second web server with the greatest network availability to re-establish the server connection and/or network connection to the virtual workspace (e.g., one of web servers 115*a*-115*h*). In some instances, and based on the comparison, computing platform 110 may determine that the web server indicated in the cookie (e.g., web server 115*a*) may comprise the greatest network availability to re-establish the server connection and/or network connection to the virtual workspace. Therefore, in some instances, computing platform 110 may determine, based on the comparison, that the second web server with the greatest network availability to re-establish the server connection and/or network connection to the virtual workspace may be the web server assigned to the host the virtual workspace, as indicated in the cookie.

In some instances, computing platform 110 (e.g., via local server load balancer 113*a*) may determine that the server pods and/or the web servers associated with local server load balancer 113*a* might not have network availability to re-establish the server connection and/or network connection to the virtual workspace and, as such, may transmit, to global server load balancer 111, a request for a different local server load balancer (e.g., local server load balancer 113*b*, or the like) to handle the re-connection request from enterprise organization computing device 120.

At step 213, computing platform 110 (e.g., via local server load balancer 113*a*) may compare the second server pod and the second web server that may have network availability to re-establish the server connection and/or network connection to the virtual workspace to the server pod and the web server assigned to host the virtual workspace (e.g., server pod 114*a* and web server 115*a* indicated in the cookie, or the like). To do so, local server load balancer 113*a* may parse connection database 116 to identify the unique identifier associated with the second server pod and/or the unique identifier associated with the second web server. Local server load balancer 113*a* may compare the unique identifier associated with the second server pod and the unique identifier associated with the second web server to the unique identifier associated with the server pod indicated in the cookie and the unique identifier associated with the web server indicated in the cookie. Local server load balancer 113*a* may determine, based on comparing the unique identifiers, whether the server pod and the web server assigned to host the virtual workspace correspond to (e.g., are the same as, or the like) the second server pod and the second web server, respectively. Local server load balancer 113*a* may use the comparison to determine whether to change the web server assignment indicated the cookie.

If, at step 213, the computing platform 110 (e.g., via local server load balancer 113*a*) determines that the second server pod and the second web server may correspond to (e.g., are the same as, or the like) the server pod and the web server assigned to host the virtual workspace, then, at step 214a, computing platform 110 may re-establish the server connection and/or network connection to the virtual workspace via the second server pod and the second web server, in accordance with the processes described herein. For example, based on the comparison described in step 213, computing platform 110 (e.g., via local server load balancer 113a) may determine that server pod 114a and web server 115a may have network availability to re-establish the server connection and/or network connection to the virtual workspace. Local server load balancer 113a may further determine that server pod 114a and web server 115a may have been assigned to host the server connection and/or network connection to the virtual workspace (e.g., as indicated in the cookie, or the like). As such, local server load balancer 113a may instruct server pod 114a and web server 115a to re-establish the server connection and/or network connection to the virtual workspace. Based on determining the second server pod and the second web server may correspond to the server pod and the web server that were assigned to host the server connection and/or network connection to the virtual workspace, computing platform 110 (e.g., via web server 115a) may determine that the connection details within the cookie might not need an update.

However, if, at step 213, computing platform 110 determines that the second server pod and the second web server might not correspond to (e.g., may be different from, or the like) the server pod and the web server assigned to host the virtual workspace, then, at step 214b, the computing platform (e.g., via local server load balancer 113a) may determine whether enterprise organization computing device 120 is authorized to modify a host web server (e.g., the web server assigned to host the server connection and/or network connection to the virtual workspace, or the like). For example, based on the comparison described in step 213, computing platform 110 (e.g., via local server load balancer 113a) may determine that server pod 114b and web server 115c may have network availability to re-establish the server connection and/or network connection to the virtual workspace. Local server load balancer 113a may further determine that server pod 114a and web server 115a may have been assigned to host the server connection and/or network connection to the virtual workspace (e.g., as indicated in the cookie, or the like). Based on determining the second server pod and the second web server might not correspond to (e.g., might be different from, or the like) the server pod and the web server indicated in the cookie, computing platform 110 (e.g., via local server load balancer 113a) may further analyze enterprise organization computing device 120 to determine whether the cookie may be updated (e.g., whether enterprise organization computing device 120 may modify the host web server).

To do so, computing platform 110 (e.g., via local server load balancer 113a) may consider criteria received from the enterprise organization (e.g., a level of clearance associated with enterprise organization computing device 120, a rank within the enterprise organization associated with enterprise organization computing device 120, authorization credentials associated with enterprise organization computing device 120, or the like). In some instances, local server load balancer 113a may receive, from the enterprise organization, a list comprising at least one enterprise organization computing device that may be authorized to modify the host web server associated with the virtual workspace.

If, at step 214b, computing platform 110 determines that enterprise organization computing device 120 may be authorized to modify the host web server associated with the virtual workspace, then, referring to FIG. 2C and at step 215a, computing platform 110 (e.g., via web server 115c) may re-establish the server connection and/or network connection to the virtual workspace. To do so, web server 115c may parse connection database 116 to extract the at least one unique identifier associated with the virtual workspace. The second web server may use the at least one unique identifier to re-launch the virtual workspace and/or re-assign a unique network address to the virtual workspace (e.g., an IP address, an Internet address, or the like) such that the virtual workspace may be located within network 150. Web server 115c may publish the virtual workspace such that the unique network address associated with the virtual workspace may be identified by at least one computing device within computing platform 110. Publishing the virtual workspace may cause the virtual workspace to be displayed via a display device of enterprise organization computing device 120 (e.g., in response to the request to re-establish the server connection and/or network connection to the virtual workspace, or the like).

Computing platform 110 (e.g., via web server 115c) may also update the cookie that corresponds to the virtual workspace. In particular, web server 115c may update the unique identifiers within the cookie to include at least an updated unique identifier that corresponds to the local server load balancer assigned to host the virtual workspace, an updated unique identifier that corresponds to the server pod assigned to host the virtual workspace, and/or an updated unique identifier that corresponds to the web server assigned to host the virtual workspace.

In instances where computing platform 110 (e.g., via local server load balancer 113a) requested that the re-connection request be handled by a different local server load balancer (e.g., local server load balancer 113b, or the like), computing platform 110 (e.g., via load server load balancer 113b) may determine that the second server pod and the second web server with network availability to re-establish the server connection and/or network connection to the virtual workspace may be associated with local server load balancer 113b (e.g., server pod 114c, web server 115e, or the like). Computing platform 110 (e.g., via web server 115e) may store, within the cookie, a unique identifier that corresponds to the different local server load balancer. Web server 115e may also update the network address that corresponds to the virtual workspace in instances where the second server assigns a network address that may be different from the network address originally assigned to host the virtual workspace. Web server 115e may store the updated cookie within connection database 116. In instances where the network address that corresponds to the virtual workspace may be different from the network address originally assigned to host the virtual workspace, web server 115e may add the network address that corresponds to the virtual workspace to audit database 117.

Alternatively, if, at step 214b, computing platform 110 determines that enterprise organization computing device 120 might not be authorized to modify the host web server associated with the virtual workspace, then, at step 215b, computing platform 110 (e.g., via web server 115c) may reject the request to re-establish the server connection and/or network connection to the virtual workspace. By doing so, web server 115c may indicate that the second server pod and the second web server (e.g., server pod 114b and web server 115e, or the like) might not be assigned to re-establish the server connection and/or network connection to the virtual workspace.

Computing platform 110 (e.g., via web server 115c) may transmit a notification to enterprise organization computing device 120 indicating rejection of the request to re-establish the server connection and/or network connection to the virtual workspace. In some instances, the notification may indicate at least one reason why the request to re-establish the server connection and/or network connection to the virtual workspace was rejected (e.g., enterprise organization computing device 120 might not be authorized to modify the host web server, or the like). In such instances, enterprise organization computing device 120 may continuously re-submit the re-connection request (e.g., for a pre-determined amount of time, until a server pod and web server with network availability to re-establish the server connection and/or network connection to the virtual workspace may be identified, until the server pod and the web server indicated in the cookie have network availability to re-establish the server connection and/or network connection to the virtual workspace, or the like).

At step 216, enterprise organization computing device 120 may disconnect from the virtual workspace and, by doing so, may terminate the server connection and/or network connection to the virtual workspace. The server connection and/or network connection may remain active while enterprise organization computing device 120 is present within the virtual workspace since enterprise organization computing device 120 may be a virtual workspace leader. As such, the absence of the virtual workspace leader (e.g., at least one of enterprise organization computing devices 120a-120c, or the like) may result in a soft deletion of the virtual workspace from network 150. However, the presence (or absence) of consumer computing device 130 within the virtual workspace might not affect the server connection and/or network connection of the virtual workspace since consumer computing device 130 may be a virtual workspace follower. As such, the presence (or absence) of the virtual workspace follower (e.g., at least one of consumer computing devices 130a-130c, or the like) might not result in the soft deletion of the virtual workspace from network 150. The soft deletion of the virtual workspace may indicate that computing devices might not be permitted to access the virtual workspace, but a record of the virtual workspace may exist within the running log of virtual workspaces within audit database 117.

At step 217, the computing platform 110 (e.g., via web server 115c) may determine whether the server connection and/or network connection between enterprise organization computing device 120 and the virtual workspace was lost due to a software and/or hardware failure within network 150 (e.g., as opposed to intentional termination of the server connection and/or network connection by enterprise organization computing device 120, or the like). Enterprise organization computing device 120 may lose the server connection and/or network connection to the virtual workspace based on at least network issue associated with at least one webpage that may be displayed within the virtual workspace and/or at least one web browser that may be used in the virtual workspace (e.g., a webpage refresh, a webpage timeout, a web browser timeout, or the like). Enterprise organization computing device 120 may terminate (e.g., intentionally, or the like) the server connection and/or network connection to the virtual workspace (e.g., based on determining a collaboration between a different one of enterprise organization computing devices 120a-120c and/or at least one of consumer computing devices 130a-130c may have been completed, determining consumer computing devices 130a-130c terminated access to the virtual workspace, or the like).

If, at step 217, computing platform 110 (e.g., via web server 115c) determines that the server connection and/or network connection between enterprise organization computing device 120 and the virtual workspace might not have been lost (e.g., may have been intentionally terminated by enterprise organization computing device 120, or the like), then, at step 218a, computing platform 110 (e.g., via web server 115c) may monitor the virtual workspace to determine whether enterprise organization computing device 120 resumes access to the virtual workspace. In some instances, enterprise organization computing device 120 may resume access to the virtual workspace and the second server may continue to host the server connection and/or network connection to the virtual workspace. However, in some instances, enterprise organization computing device 120 might not resume access and, as such, computing platform 110 (e.g., via web server 115c) may compare an amount of time that enterprise organization computing device 120 lost the connection to a timeout period, as discussed in detail below.

If, at step 217, computing platform 110 (e.g., via web server 115c) determines that the server connection and/or network connection between enterprise organization computing device 120 and the virtual workspace may have been lost (e.g., might not have been intentionally terminated by enterprise organization computing device 120, or the like), then, at step 218b, computing platform 110 (e.g., via web server 115c) may determine whether the timeout period passed. A timeout threshold value may correspond to a pre-determined amount of time (e.g., determined by the enterprise organization, or the like) during which enterprise organization computing device 120 may be expected to resume access to the virtual workspace (e.g., an amount of time that enterprise organization computing device 120 may need to complete the webpage refresh, an amount of time that enterprise organization computing device 120 may need to recover from the webpage timeout, an amount of time that enterprise organization computing device 120 may need to recover from the web browser timeout, or the like). Web server 115c may monitor an amount of time since the server connection and/or network connection between enterprise organization computing device 120 and the virtual workspace was interrupted. Web server 115c may compare the amount of time to the timeout threshold value to determine whether the timeout period has passed.

Computing platform 110 (e.g., via web server 115c) may determine that the timeout period may have passed based on determining the amount of time since the server connection and/or network connection between enterprise organization computing device 120 and the virtual workspace was interrupted may be equal to or greater than the timeout threshold value. Alternatively, web server 115c may determine that the timeout period might not have passed based on determining the amount of time since the server connection and/or network connection between enterprise organization computing device 120 and the virtual workspace was interrupted may be less than the timeout threshold value.

If, at step 218b, computing platform 110 determines that the timeout period might not have passed, then, at step 219a, computing platform 110 (e.g., via web server 115c) may continue to monitor the virtual workspace to determine whether enterprise organization computing device 120 may have resumed access to the virtual workspace and/or whether enterprise organization computing device 120 may have established a network connection and/or server connection to the second web server. In some instances, enterprise organization computing device 120 may resume access to the virtual workspace and web server 115*c* may continue to host the server connection and/or network connection to the virtual workspace. However, in some instances, enterprise organization computing device 120 might not resume access and, as such, web server 115*c* may soft delete the virtual workspace from network 150, as discussed in detail below.

However, if, at step 218*b*, the computing platform 110 determines that the timeout period may have passed, then, at step 219*b*, the computing platform 110 (e.g., via web server 115*c*) may soft delete the virtual workspace from network 150. The soft deletion of the virtual workspace may indicate that the virtual workspace might not be associated with a virtual workspace leader (e.g., enterprise organization computing devices 120*a*-120*c* might not be present within the virtual workspace, or the like). The soft deletion of the virtual workspace may also terminate the server connection and/or network connection between enterprise organization computing device 120 and at least one web server (e.g., web server 115*a*, web server 115*c*, or the like). As a result, computing devices might not be permitted to access the virtual workspace.

Computing platform 110 (e.g., via web server 115*c*) may update connection database 116 and audit database 117 accordingly. In particular, web server 115*c* may indicate, in connection database 116, at least one explanation for the soft deletion of the virtual workspace from network 150. Web server 115*c* may also indicate, in audit database 117, that the virtual workspace existed within network 150, but may have been soft deleted from network 150 due to the failure of at least one virtual workspace leader to appear within the virtual workspace. Web server 115*c* may also indicate, within audit database 117, that neither virtual workspace leaders nor virtual workspace followers may be permitted to access the virtual workspace. Since audit database 117 may comprise a running log of the virtual workspaces hosted on network 150, the data within audit database 117 might not be removed. Instead, web server 115*c* may insert, within audit database 117, at least one note indicating updates to at least one virtual workspace.

Computing platform 110 (e.g., via web server 115*c*) may also transmit, to consumer computing device 130, a notification indicating that access to the virtual workspace may be terminated (e.g., based on enterprise organization computing device 120 failing to resume access to the virtual workspace, or the like). Since the virtual workspace might not remain active within network 150 in the absence of a virtual workspace leader (e.g., at least one of enterprise organization computing devices 120*a*-120*c*, or the like), consumer computing device 130 might not maintain access to the virtual workspace (e.g., access to the virtual workspace may be terminated, or the like). The notification may further indicate at least one reason for terminating access to the virtual workspace.

Moreover, computing platform 110 (e.g., via web server 115*c*) may transmit, to enterprise organization computing device 120, a notification indicating that access to the virtual workspace may be terminated (e.g., based on the soft deletion of the virtual workspace from network 150, based on enterprise organization computing device 120 disconnecting from the virtual workspace, or the like). The notification may also indicate that a second request to establish a second server connection and/or network connection may be needed to establish a second virtual workspace within network 150.

In some instances, computing platform 110 may receive, from consumer computing device 130, at least one request to access at least one virtual workspace established by enterprise organization computing device 120.

Figure 3A:
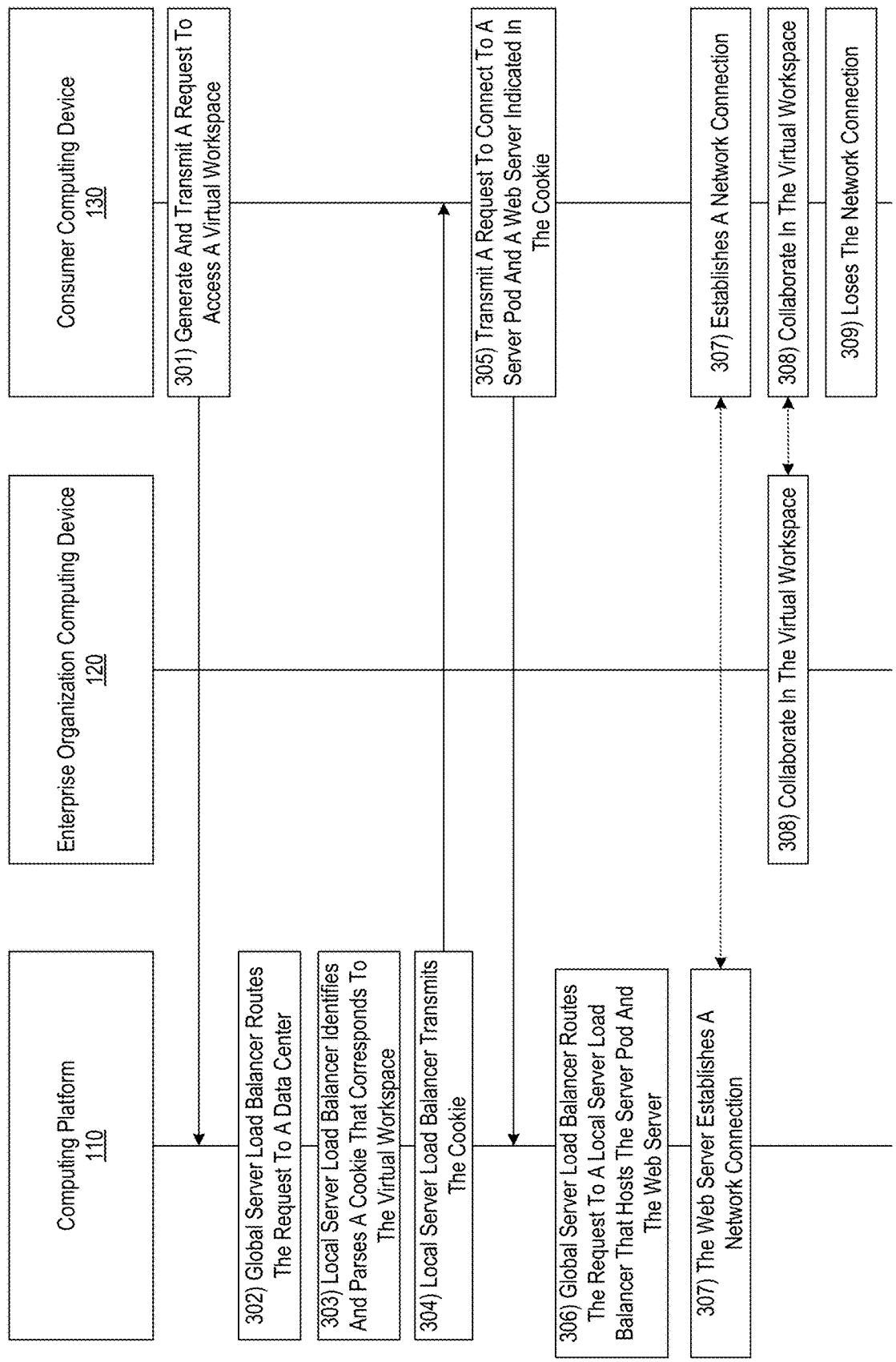
FIGS. 3A-3B depict an illustrative event sequence for accessing and interacting with requested web content using a modified web farm framework, in accordance with one or more example embodiments.
Figure 3B:
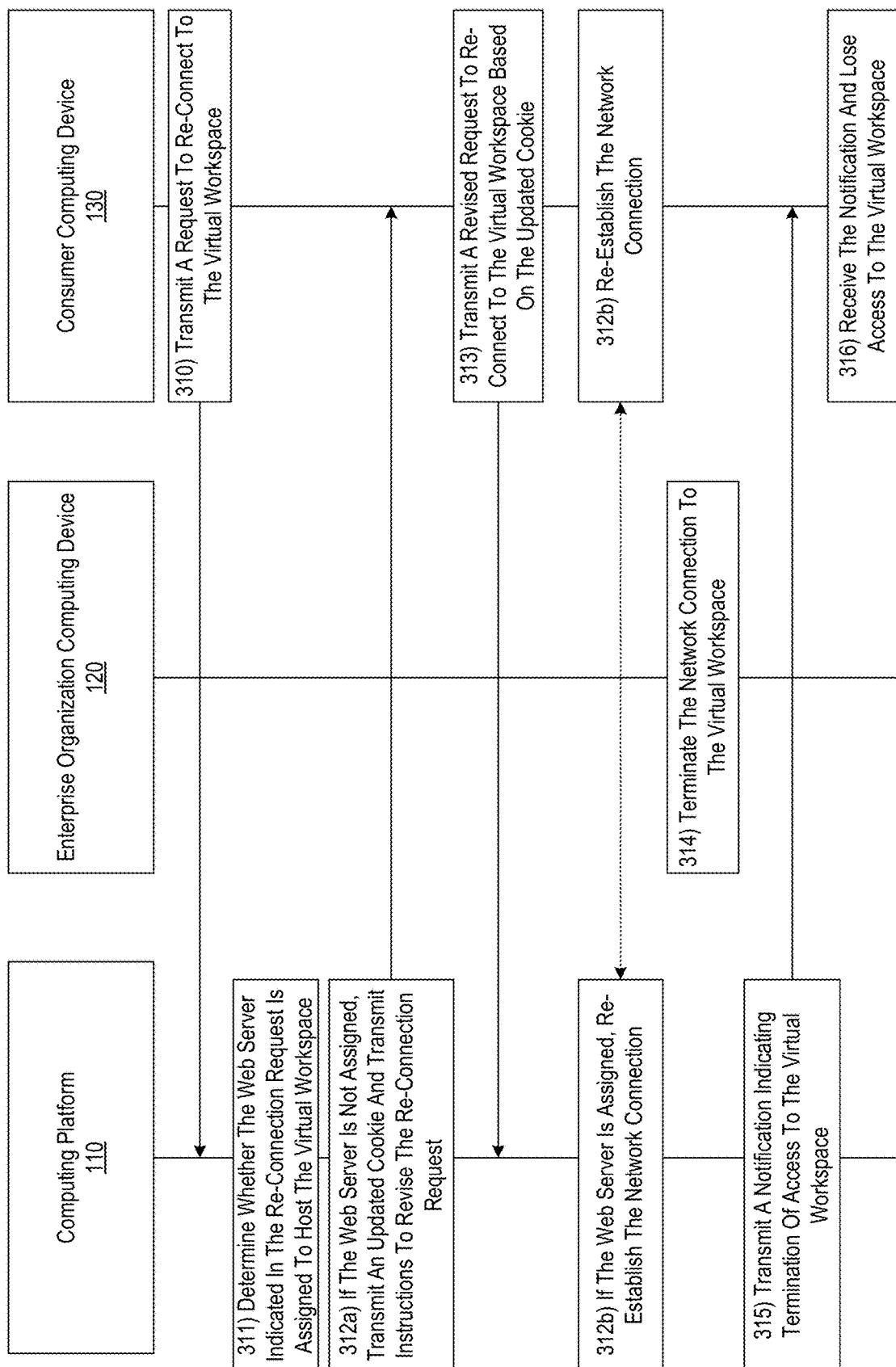

FIGS. 3A-3B depict an illustrative event sequence for accessing and interacting, in real-time or near real-time, with requested web content using a modified web farm framework, in accordance with one or more aspects described herein. While aspects described with respect to FIGS. 3A-3B include the evaluation of a single consumer request to access an established virtual workspace, a plurality of consumer requests may be evaluated (e.g., in parallel) without departing from the present disclosure. One or more process performed in FIGS. 3A-3B may be performed in real-time or near real-time and one or more steps or processes may be added, omitted, or performed in a different order, without departing from the present disclosure.

Referring to FIG. 3A, at step 301, consumer computing device 130 may generate and transmit, to computing platform 110, a request to access a virtual workspace established by at least one of web servers 115*a*-115*h*. The consumer request may comprise at least one unique identifier associated with the virtual workspace (e.g., a workspaceID, a webpage address that corresponds to an enterprise organization webpage, an Internet address that corresponds to an enterprise organization web portal, an Internet address that corresponds to a consumer portal, or the like).

In some instances, consumer computing device 130 may receive, from computing platform 110 (e.g., from global server load balancer 111 of computing platform 110), a list indicating a plurality of virtual workspaces that may be active within network 150. The list may further indicate at least one unique identifier that corresponds to each virtual workspace. Consumer computing device 130 may parse the plurality of virtual workspaces and may elect at least one virtual workspace to connect to, and may generate the request based on the elected virtual workspace and the corresponding unique identifier.

At step 302, computing platform 110 (e.g., via global server load balancer 111) may receive the request from consumer computing device 130 and may identify at least one data center (e.g., at least one of data centers 112*a*-112*b*, or the like) that may analyze the consumer request. For instance, global server load balancer 111 may consider a network availability of server pods 114*a*-114*d* and/or web servers 115*a*-115*h* to determine a network availability of data centers 112*a*-112*b*. Global server load balancer 111 may compare the network availability of each data center (e.g., data centers 112*a*-112*b*, or the like) and may identify a data center that may analyze the consumer request. Based on determining data center 112*a* may have network availability to analyze the consumer request, global server load balancer 111 may route the consumer request to data center 112*a* of computing platform 110.

At step 303, computing platform 110 (e.g., via local server load balancer 113*a*) may parse the consumer request to identify a cookie that may correspond to the virtual workspace indicated in the consumer request. To do so, local server load balancer 113*a* may extract at least one unique identifier that corresponds to the virtual workspace (e.g., the workspaceID, the webpage address that corresponds to the enterprise organization webpage, the Internet address that corresponds to the enterprise organization web portal, the Internet address that corresponds to the consumer portal, or the like). Local server load balancer 113a may use the at least one extracted unique identifier to parse connection database 116 and to identify the virtual workspace that corresponds to the at least one extracted unique identifier. Local server load balancer 113a may identify, based on the parsing, the virtual workspace that corresponds to the unique identifiers indicated in the consumer request and may extract a copy of the cookie associated with the virtual workspace.

At step 304, computing platform 110 (e.g., via local server load balancer 113a) may transmit the cookie to consumer computing device 130. The transmitted cookie may comprise connection details that correspond to the virtual workspace and that may be used to generate a request to access the virtual workspace.

At step 305, consumer computing device 130 may receive the cookie from computing platform 110, and may generate and transmit a request to access a server pod and a web server assigned to host the virtual workspace. To do so, consumer computing device 130 may parse the cookie and may identify unique identifiers associated with each computing device assigned to host the virtual workspace (e.g., data center 112a, local server load balancer 113a, server pod 114a, web server 115a, or the like). Consumer computing device 130 may generate a request to connect to at least one of the computing devices indicated in the cookie. Consumer computing device 130 may transmit the request comprising the unique identifiers to computing platform 110.

At step 306, computing platform 110 (e.g., via global server load balancer 111) may receive, from consumer computing device 130, the request comprising the unique identifiers that correspond to the computing devices assigned to host the virtual workspace. For instance, global server load balancer 111 may parse the consumer request and may extract the unique identifier contained therein. Global server load balancer 111 may parse the unique identifiers to identify the computing devices assigned to host the virtual workspace and may transmit the request to the identified local server load balancer (e.g., local server load balancer 113a, or the like).

At step 307, computing platform 110 (e.g., via local server load balancer 113b) may receive and parse the request to identify the remaining computing devices assigned to host the virtual workspace. Based on the parsing, local server load balancer 113a may transmit the request to the identified server pod (e.g., server pod 114a, or the like) and the identified web server (e.g., web server 115a, or the like). Computing platform 110 (e.g., via web server 115a) may establish a server connection and/or network connection to the virtual workspace and may share the server connection and/or network connection with consumer computing device 130. To do so, web server 115e may parse connection database 116 to identify a network address associated with the virtual workspace. In some instances, web server 115e may transmit the network address to consumer computing device 130. Transmitting the network address to consumer computing device 130 may cause the virtual workspace to be displayed via a display device on consumer computing device 130.

At step 308, consumer computing device 130 may use the virtual workspace to collaborate with at least one additional computing device (e.g., at least one of enterprise organization computing devices 120a-120c, a different one of consumer computing devices 130a-130c, or the like). Consumer computing device 130 and enterprise organization computing device 120 may participate in a shared, web-based experience, wherein edits and/or modifications generated by consumer computing device 130 (or enterprise organization computing device 120) may be reflected in real-time, or near real-time, via the display device of enterprise organization computing devices 120 (or consumer computing device 130).

At step 309, consumer computing device 130 may lose the server connection and/or network connection to the virtual workspace. In some instances, consumer computing device 130 may lose the server connection and/or network connection based on a software and/or hardware issue associated with the virtual workspace (e.g., consumer computing device 130 may experience a webpage timeout based on receiving webpage modifications generated by enterprise organization computing device 120, consumer computing device 130 may experience a web browser timeout based on transmitting webpage modifications to enterprise organization computing device 120, or the like). Therefore, the loss of the server connection and/or network connection may be based on a configuration strength associated with network 150 and components therein.

Additionally or alternatively, consumer computing device 130 may lose the server and/or network connection based on disconnecting (e.g., intentionally, or the like) from the virtual workspace, based on updates to the connection details associated with the virtual workspace (e.g., enterprise organization computing device 120 may modify the host web server assigned to host the virtual workspace, or like), and/or based on enterprise organization computing devices 120a-120c disconnecting from the virtual workspace (e.g., based on the lack of a virtual workspace leader within the virtual workspace, or the like). However, the server connection and/or network connection to the virtual workspace may remain active while at least one virtual workspace leader (e.g., at least one of enterprise organization computing devices 120a-120c, or the like) is present within the virtual workspace.

Referring to FIG. 3B, at step 310, consumer computing device 130 may initiate a re-connection loop to re-connect to the virtual workspace. To do so, consumer computing device 130 may transmit, to computing platform 110 (e.g., to global server load balancer 111), a request to re-connect to the virtual workspace, wherein the request may comprise connection details from the cookie received from computing platform 110 (e.g., from local server load balancer 113a).

At step 311, computing platform 110 (e.g., via global server load balancer 111) may receive the re-connection request from consumer computing device 130 and may parse the re-connection request to identify the remaining computing devices assigned to host the virtual workspace (e.g., data center 112a, local server load balancer 113a, server pod 114a, web server 115a, or the like). Global server load balancer 111 may transmit the re-connection request to the data center and local server load balancer indicated in the cookie.

Local server load balancer 113a may receive the re-connection request and may route the re-connection request to the server pod and the web server assigned to host the virtual workspace. Web server 115a may receive and parse the re-connection request to extract the connection details within the cookie. Web server 115a may also parse connection database 116 and may extract the cookie that corresponds to the virtual workspace. Web server 115a may compare the connection details within the cookie received from consumer computing device 130 to the connection details within the cookie extracted from connection database 116. Web server 115e may determine whether the connection details within the cookie received from consumer computing device 130 correspond to (e.g., are the same as, are within a pre-determined range of, or the like) the connection details within the cookie extracted from connection database 116.

In some instances, the cookie stored within connection database 116 may comprise updated connection details that correspond to the virtual workspace (e.g., an updated data center assigned to host the virtual workspace, an updated server pod assigned to host the virtual workspace, an update web server assigned to host the virtual workspace, or the like). For example, the updated connection details may indicate that enterprise organization computing device 120 modified the host web server (e.g., the web server assigned to host the virtual workspace, or the like). In such instances, consumer computing device 130 may lose the server connection and/or network connection to the virtual workspace based on enterprise organization computing device 120 changing the host web server from a first web server to a second web server. As such, the server connection and/or network connection between consumer computing device 130 and the virtual workspace may terminate since the virtual workspace might not be associated with the web server that was previously assigned to host the virtual workspace. Therefore, in some instances, the comparison of the connection details within the cookie received from consumer computing device 130 and the connection details within the cookie extracted from connection database 116 may indicate at least one reason why consumer computing device 130 lost the server connection and/or network connection to the virtual workspace.

If, at step 311, computing platform 110 (e.g., via web server 115a) determines the connection details within the cookie received from consumer computing device 130 might not correspond to (e.g., may be different from, or the like) the connection details within the cookie extracted from connection database 116, then, at step 312a, computing platform 110 (e.g., via web server 115a) may extract a copy of an updated cookie from connection database 116 and may transmit the copy of the updated cookie to consumer computing device 130. Computing platform 110 (e.g., via web server 115a) may also transmit, to consumer computing device 130, a notification indicating that the connection details within the cookie received from consumer computing device 130 might not reflect updated connection details. Web server 115a may instruct consumer computing device 130 to generate a revised re-connection request (e.g., based on the updated cookie, or the like).

At step 313, consumer computing device 130 may receive, from computing platform 110, the updated cookie and the instructions, and may generate a revised re-connection request based on the updated connection details within the updated cookie (e.g., an updated unique identifier associated with an updated server pod assigned to host the virtual workspace, an updated unique identifier associated with an updated web server assigned to host the virtual workspace, or the like). Consumer computing device 130 may transmit the revised re-connection request to computing platform 110 (e.g., to global server load balancer 111).

In some instances, and similar to the process described above, computing platform 110 (e.g., via global server load balancer 111) may parse the revised re-connection request to identify the revised computing devices assigned to host the virtual workspace. Global server load balancer 111 may transmit the revised re-connection request to the data center and local server load balancer indicated in the revised re-connection request (e.g., data center 112b, local server load balancer 113b, or the like). Local server load balancer 113b may parse the revised re-connection request to identify the revised server pod and revised web server assigned to host the virtual workspace (e.g., server pod 114d, web server 115g, or the like). Local server load balancer 113b may transmit the revised re-connection request to the updated web server assigned to host the virtual workspace (e.g., web server 115g, or the like).

Computing platform 110 (e.g., via web server 115g) may parse the revised re-connection request to identify a unique identifier associated with the virtual workspace, and may parse connection database 116 to extract an updated cookie that corresponds to the virtual workspace. Web server 115g may compare the revised connection details indicated in the revised re-connection request to the revised connection details extracted from the updated cookie. Based on determining the revised connection details indicated in the revised re-connection request might not correspond to (e.g., may be different from, or the like) the revised connection details extracted from the updated cookie, web server 115g may extract further updated connection details from connection database 116 (e.g., a second updated cookie, or the like) and may transmit the second updated cookie to consumer computing device 130 with instructions to revise the re-connection request based on the updated connection details within the second updated cookie. Web server 115g may repeat process described herein for a period of time (e.g., until the connection details within the re-connection request correspond to the connection details indicated in connection database 116, until enterprise organization computing device 120 terminates access to the virtual workspace, or the like).

Alternatively, based on determining the revised connection details indicated in the revised re-connection request correspond to (e.g., may be the same as, or the like) the revised connection details extracted from the updated cookie, computing platform 110 (e.g., via web server 115g) may re-establish the server connection and/or network connection between consumer computing device 130 and the virtual workspace. In particular, web server 115g may extract, from connection database 116, an updated network address that corresponds to the virtual workspace and may transmit the updated network address to consumer computing device 130. In some instances, the transmission may cause the virtual workspace to be displayed via a display device on consumer computing device 130.

However, if, at step 311, computing platform 110 (e.g., via web server 115a) determines the connection details within the cookie received from consumer computing device 130 correspond to (e.g., may be the same as, or the like) the connection details within the cookie extracted from connection database 116, then, at step 312b, computing platform 110 (e.g., via web server 115a) may re-establish the server connection and/or network connection between consumer computing device 130 and the virtual workspace. Web server 115a may parse connection database 116 to identify the network address associated with the virtual workspace. In some instances, web server 115a may transmit the network address to consumer computing device 130 and may cause the virtual workspace to be displayed via the display device on consumer computing device 130. Computing platform 110 (e.g., via web server 115a) may further transmit, to consumer computing device 130, a notification indicating restoration of the server connection and/or network connection to the virtual workspace, and indicating restoration of access to the virtual workspace. Based on the restored connection to the virtual workspace, consumer computing device 130 may collaborate with at least one of enterprise organization computing devices 120a-120c within the virtual workspace.

At step 314, enterprise organization computing device 120 may terminate the server connection and/or network connection to the virtual workspace (e.g., enterprise organization computing device 120 may disconnect from the virtual workspace, or the like). As a virtual workspace leader, the presence of at least one of enterprise organization computing devices 120a-120c may be needed for the server connection and/or network connection to the virtual workspace to remain active within network 150. Therefore, the absence of the virtual workspace leader within the virtual workspace may result in a soft deletion of the virtual workspace from network 150. The soft deletion of the virtual workspace may indicate that computing devices might not be permitted to access the virtual workspace, but a record of the virtual workspace may exist within a running log of virtual workspaces within audit database 117.

At step 315, computing platform 110 (e.g., via web server 115a (or web server 115g) assigned to host the virtual workspace) may receive a network alert (e.g., from network 150, or the like) indicating that enterprise organization computing device 120 terminated access to the virtual workspace. Since the absence of enterprise organization computing devices 120a-120c within the virtual workspace may result in the soft deletion of the virtual workspace from network 150, computing platform 110 (e.g., via web server 115a (or web server 115g) assigned to host the virtual workspace) may determine that consumer computing device 130 might not access the virtual workspace based on the virtual workspace experiencing the soft deletion from network 150. As such, computing platform 110 (e.g., via web server 115a (or web server 115g) assigned to host the virtual workspace) may transmit, to consumer computing device 130, a notification indicating termination of access to the virtual workspace (e.g., consumer computing device 130 might not be permitted to access the virtual workspace, or the like).

At step 316, consumer computing device 130 may receive the notification from computing platform 110 (e.g., from web server 115a (or web server 115g) assigned to host the virtual workspace). Based on enterprise organization computing device 120 disconnecting from the virtual workspace, at step 316, consumer computing device 130 may lose access to the virtual workspace.

Figure 4:
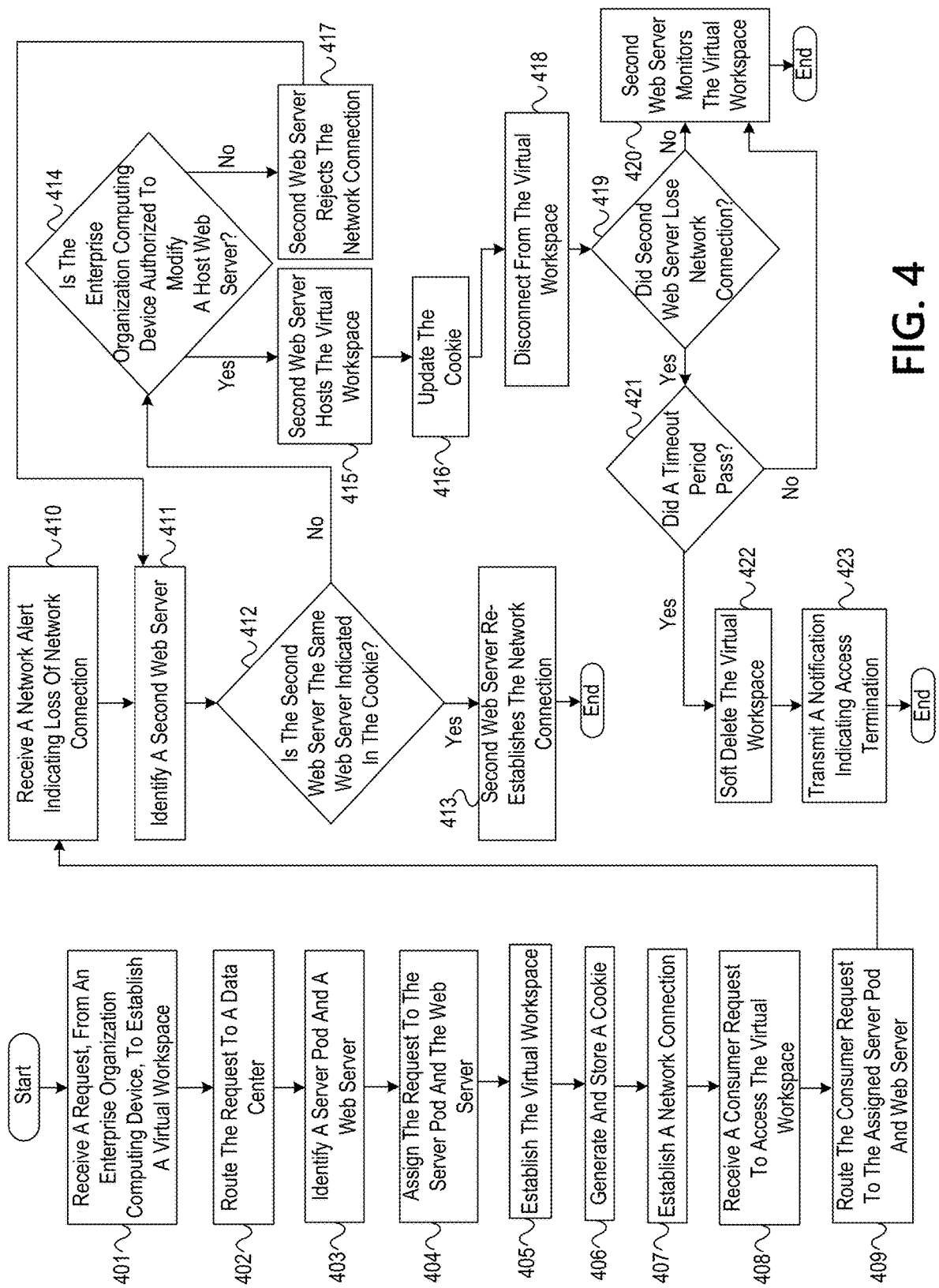
FIG. 4 depicts an illustrative method for generating a modified web farm framework for routing web traffic based on similarities between the web traffic requests, in accordance with one or more example embodiments.

FIG. 4 depicts a flow diagram illustrating one example method for generating, in real-time or near real-time, a modified web farm framework for routing web traffic based on similarities between web traffic requests, in accordance with one or more aspects described herein. The processes illustrated in FIG. 4 are merely sample processes and functions. The steps shown may be performed in the order shown, in a different order, more steps may be added, or one or more steps may be omitted, without departing from the disclosure. In some examples, one or more steps may be performed simultaneously with other steps shown and described. Further, one or more steps described with respect to FIG. 4 may be performed in real-time or near real-time.

Referring to FIG. 4, at step 401, global server load balancer 111 may receive, from enterprise organization computing device 120, a request to establish a server connection and/or network connection to host a virtual workspace, and may parse the request to identify a data center (e.g., one of data centers 112a-112b, or the like) that may have network availability to host the server connection and/or network connection to the virtual workspace.

At step 402, based on determining data center 112a may have network availability to host the virtual workspace (e.g., may have the greatest network availability to host the server connection and/or network connection to the virtual workspace, or the like), global server load balancer 111 may route the request to data center 112a.

At step 403, data center 112a may receive the request from global server load balancer 111 and may identify a server pod (e.g., at least one of server pods 114a-114b of data center 112a, or the like), and/or a web server (e.g., at least one of web servers 115a-115d of data center 112a, or the like) that may host the virtual workspace.

Local server load balancer 113a may compare a network capacity of each server pod to a network availability of each server pod to identify a server pod (e.g., server pod 114a, or the like) with the greatest network availability to host the virtual workspace (e.g., a server pod associated with the least volume of current network traffic, or the like). Based on determining server pod 114a may be associated with the greatest network availability to host the virtual workspace, local server load balancer 113a may compare the network capacity of each web server therein to the network availability of each web server therein to identify the web server (e.g., web server 115a, or the like) with the greatest network availability to host the virtual workspace.

At step 404, local server load balancer 113a may route the request to the identified web server (e.g., web server 115a, or the like) associated with the identified server pod with network availability to host the virtual workspace (e.g., server pod 114a, or the like), and may assign the identified server pod and the identified web server to host the virtual workspace.

At step 405, web server 115a may receive the request from local server load balancer 113a and may establish the server connection and/or network connection to the virtual workspace based on extracting, from the request, at least one unique identifier associated with the virtual workspace (e.g., a workspaceID, a webpage address that corresponds to the enterprise organization webpage, an Internet address that corresponds to the enterprise organization web portal, an Internet address that corresponds to the consumer portal, or the like). Web server 115a may use the extracted data to launch and publish the virtual workspace.

At step 406, web server 115a may generate a cookie comprising server and/or network connection details that correspond to the virtual workspace. The cookie may indicate the server pod and the web server to which local server load balancer 113a may assign the virtual workspace. The connection details within the cookie may comprise a unique identifier that corresponds to the local server load balancer (e.g., local server load balancer 113a, or the like) that may host the server pod and the web server assigned to host the virtual workspace, a unique identifier that corresponds to the server pod assigned to host the virtual workspace, a unique identifier that corresponds to the web server assigned to host the virtual workspace, a network address that corresponds to the virtual workspace, or the like. Web server 115a may store the cookie within connection database 116.

At step 407, web server 115a may establish a server connection and/or network connection to the virtual workspace and may share the server connection and/or network connection with enterprise organization computing device 120.

At step 408, global server load balancer 111 may receive a request, from consumer computing device 130, to access the virtual workspace. Based on parsing the consumer request, global server load balancer 111 may identify a unique identifier that corresponds to the virtual workspace. Global server load balancer 111 may identify, within connection database 116, the cookie comprising the connection details associated with the virtual workspace and may transmit the cookie to consumer computing device 130. Global server load balancer 111 may receive, from consumer computing device 130, a request to establish a network connection and/or server connection with the server pod and the web server assigned to host the virtual workspace, as indicated in the cookie.

At step 409, global server load balancer 111 may route the consumer request to the data center (e.g., data center 112a, or the like) that may host the server pod and the web server assigned to host the virtual workspace. Local server load balancer 113a of data center 112a may parse the consumer request and may route the consumer request to the server pod and the web server assigned to host the virtual workspace (e.g., server pod 114a, web server 115a, or the like). Web server 115a may receive the consumer request and may establish a server connection and/or network connection between consumer computing device 130 and the virtual workspace.

At step 410, enterprise organization computing device 120 may lose the server connection and/or network connection to the virtual workspace and local server load balancer 113a may receive a network alert (e.g., from network 150, or the like) indicating that enterprise organization computing device 120 lost the server connection and/or network connection to the virtual workspace.

At step 411, local server load balancer 113a may identify a web server (e.g., a second web server, or the like) that may be used to re-establish the server connection and/or network connection to the virtual workspace. Local server load balancer 113a may compare the network capacity of each corresponding server pod to the current network availability of each corresponding server pod to identify a second server pod with the greatest network availability to re-establish the server connection and/or network connection to the virtual workspace.

At step 412, local server load balancer 113a may compare the second server pod and the second web server that may have network availability to re-establish the server connection and/or network connection to the virtual workspace to the server pod and the web server assigned to host the virtual workspace (e.g., indicated in the cookie, or the like) to determine whether the server pod and the web server indicated in the cookie correspond to (e.g., are the same as, or the like) the second server pod and the second web server.

In some instances, and based on the comparison, computing platform 110 may determine that the server pod indicated in the cookie (e.g., server pod 114a) may comprise network capacity to re-establish the server connection and/or network connection to the virtual workspace. Therefore, in some instances, computing platform 110 may determine, based on the comparison, that the second server pod with the greatest network availability to re-establish the server connection and/or network connection to the virtual workspace may be the server pod assigned to the host the virtual workspace, as indicated in the cookie.

Further, in some instances and based on the comparison, computing platform 110 may determine that the web server indicated in the cookie (e.g., web server 115a) may comprise the greatest network availability to re-establish the server connection and/or network connection to the virtual workspace. Therefore, in some instances, computing platform 110 may determine, based on the comparison, that the second web server with the greatest network availability to re-establish the server connection and/or network connection to the virtual workspace may be the web server assigned to the host the virtual workspace, as indicated in the cookie.

If, at step 412, local server load balancer 113a determines that the second server pod and the second web server (e.g., server pod 114a, web server 115a, or the like) correspond to (e.g., are the same as, or the like) the server pod and the web server assigned to host the virtual workspace (e.g., server pod 114a and web server 115a as indicated in the cookie, or the like), then, at step 413, server pod 114a and web server 115a may re-establish the server connection and/or network connection to the virtual workspace, in accordance with the processes described herein.

However, if, at step 412, local server load balancer 113a determines that the second server pod and the second web server (e.g., server pod 114b, web server 115c, or the like) might not correspond to (e.g., may be different from, or the like) the server pod and the web server assigned to host the virtual workspace (e.g., server pod 114a and web server 115a as indicated in the cookie, or the like), then, at step 414, web server 115c may determine whether enterprise organization computing device 120 is authorized to modify a host web server (e.g., the web server assigned to host the server connection and/or network connection to the virtual workspace, or the like).

If, at step 414, local server load balancer 113a determines that enterprise organization computing device 120 may be authorized to modify the host web server associated with the virtual workspace, then, at step 415, web server 115c may re-establish the server connection and/or network connection to the virtual workspace.

At step 416, web server 115c may update the cookie that corresponds to the virtual workspace. In particular, web server 115c may update the unique identifiers within the cookie to include at least an updated unique identifier that corresponds to the local server load balancer assigned to host the virtual workspace, an updated unique identifier that corresponds to the server pod assigned to host the virtual workspace, and/or an updated unique identifier that corresponds to the web server assigned to host the virtual workspace.

However, if, at step 414, local server load balancer 113a determines that enterprise organization computing device 120 might not be authorized to modify the host web server associated with the virtual workspace, then, at step 417, web server 115c may reject the server connection and/or network connection to the virtual workspace. In such instances, the process described herein may return to step 411 in that local server load balancer 113a may identify a different web server that may have network processing availability to re-establish a server connection and/or network connection to the virtual workspace. In some instances, enterprise organization computing device 120 may continuously transmit re-connection requests (e.g., for a pre-determined amount of time, until a server pod and web server with network availability to re-establish the server connection and/or network connection to the virtual workspace may be identified, or the like).

At step 418, enterprise organization computing device 120 may disconnect from the virtual workspace and, by doing so, may terminate the server connection and/or network connection to the virtual workspace.

At step 419, web server 115c may determine whether enterprise organization computing device 120 lost the server connection and/or network connection due to a software and/or hardware failure within network 150 (e.g., as opposed to intentional termination of the server connection and/or network connection by enterprise organization computing device 120, or the like).

If, at step 419, web server 115c determines that the server connection and/or network connection between enterprise organization computing device 120 and the virtual workspace might not have been lost (e.g., may have been intentionally terminated by enterprise organization computing device 120, or the like), then, at step 420, web server 115c may monitor the virtual workspace to determine whether enterprise organization computing device 120 resumes access to the virtual workspace.

However, if, at step 419, web server 115c determines that the server connection and/or network connection between enterprise organization computing device 120 and the virtual workspace may have been lost (e.g., might not have been intentionally terminated by enterprise organization computing device 120, or the like), then, at step 421, web server 115c may determine whether a timeout period passed. A timeout threshold value may correspond to a pre-determined amount of time (e.g., determined by the enterprise organization, or the like) during which enterprise organization computing device 120 may be expected to resume access to the virtual workspace. Web server 115c may monitor an amount of time since the server connection and/or network connection between enterprise organization computing device 120 and the virtual workspace was interrupted. Web server 115c may compare the amount of time to the timeout threshold value to determine whether the timeout period has passed.

If, at step 421, web server 115c determines that the timeout period might not have passed, then the process described herein may return to step 420 and the second web server may continue to monitor the virtual workspace to determine whether enterprise organization computing device 120 may have resumed access to the virtual workspace and/or whether enterprise organization computing device 120 may have re-established a network connection and/or server connection to the second web server.

Alternatively, if, at step 421, web server 115c determines that the timeout period may have passed, then, at step 422, web server 115c may soft delete the virtual workspace from network 150. The soft deletion of the virtual workspace may indicate that at least one of enterprise organization computing devices 120a-120c might not be present within the virtual workspace.

At step 423, web server 115c may transmit, to consumer computing device 130, a notification indicating that access to the virtual workspace may be terminated (e.g., based on enterprise organization computing device 120 failing to resume access to the virtual workspace, or the like). Web server 115c may also transmit, to enterprise organization computing device 120, a notification indicating that access to the virtual workspace may be terminated (e.g., based on the soft deletion of the virtual workspace from network 150, based on enterprise organization computing device 120 disconnecting from the virtual workspace, or the like). The notification may also indicate that an additional request to establish a second server connection and/or network connection may be needed to establish a second virtual workspace within network 150.

Figure 5:
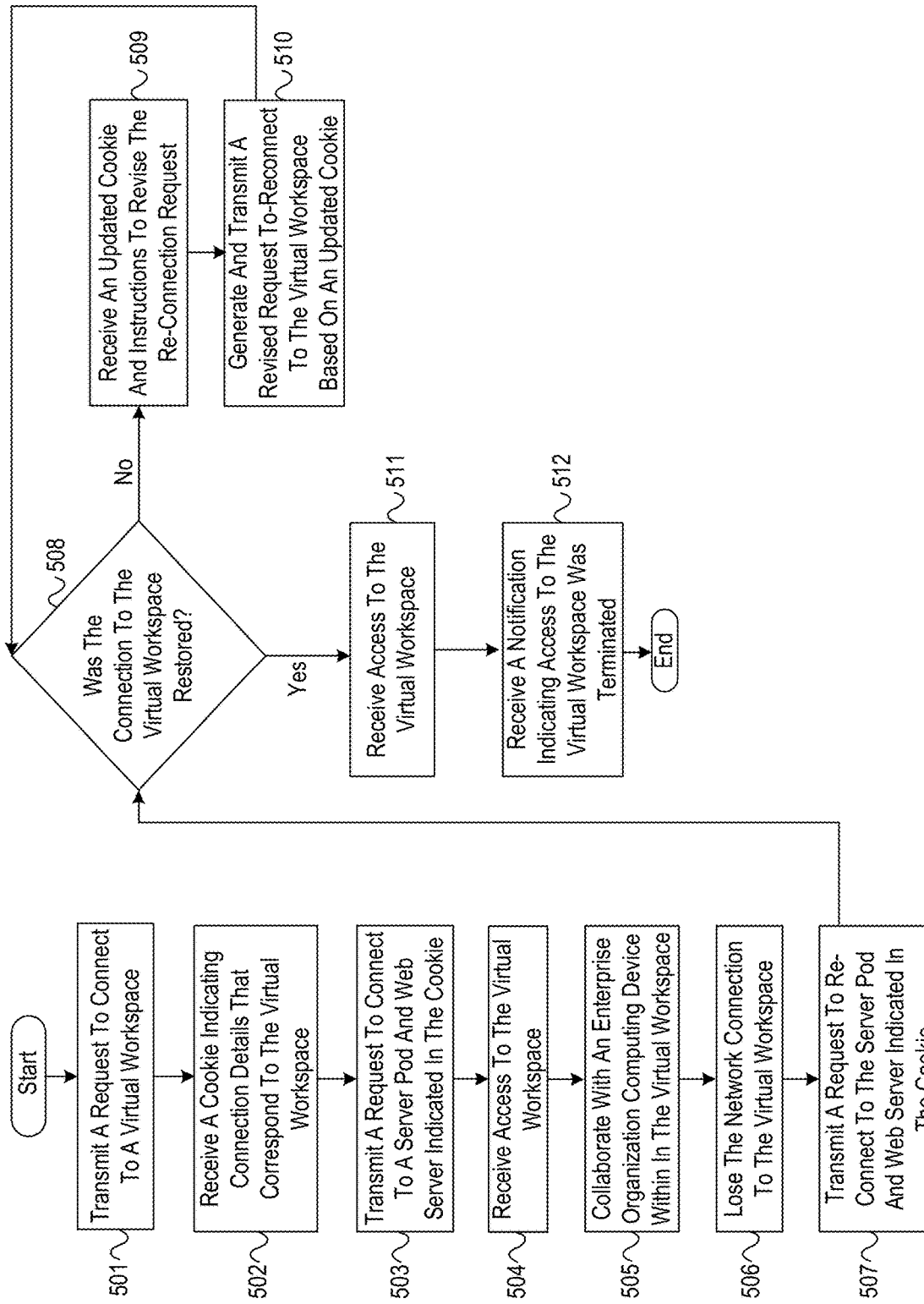
FIG. 5 depicts an illustrative method for accessing and interacting with requested web content using a modified web farm framework, in accordance with one or more example embodiments.

FIG. 5 depicts a flow diagram illustrating one example method for accessing and interacting with, in real-time or near real-time, requested web content using a modified web farm framework, in accordance with one or more aspects described herein. The processes illustrated in FIG. 5 are merely sample processes and functions. The steps shown may be performed in the order shown, in a different order, more steps may be added, or one or more steps may be omitted, without departing from the disclosure. In some examples, one or more steps may be performed simultaneously with other steps shown and described. Further, one or more steps described with respect to FIG. 5 may be performed in real-time or near real-time.

Referring to FIG. 5, at step 501, consumer computing device 130 may generate and transmit, to global server load balancer 111, a request to access a virtual workspace established by at least one of web servers 115a-115h. Global server load balancer 111 may process the consumer request based on the method described herein.

At step 502, consumer computing device 130 may receive, from local server load balancer 113a, a cookie comprising connection details that correspond to the virtual workspace and that may be used to generate a request to access the virtual workspace.

At step 503, consumer computing device 130 may generate and transmit a request to access a server pod and a web server assigned to host the virtual workspace (e.g., server pod 114a, web server 115a, or the like).

At step 504, consumer computing device 130 may receive, from web server 115a, a server connection and/or network connection to the virtual workspace. In some instances, consumer computing device 130 may receive, from web server 115a, a network address that corresponds to the virtual workspace. Receipt of the network address may cause the virtual workspace to be displayed via a display device on consumer computing device 130.

At step 505, consumer computing device 130 may use the virtual workspace to collaborate with at least one additional computing device (e.g., at least one of enterprise organization computing devices 120a-120c, a different one of consumer computing devices 130a-130c, or the like). Consumer computing device 130 and enterprise organization computing device 120 may participate in a shared, web-based experience, wherein edits and/or modifications generated by consumer computing device 130 (or enterprise organization computing device 120) may be reflected in real-time, or near real-time, via the display device of enterprise organization computing device 120 (or consumer computing device 130).

At step 506, consumer computing device 130 may lose the server connection and/or network connection to the virtual workspace. In some instances, consumer computing device 130 may lose the server connection and/or network connection based on a software and/or hardware issue associated with the virtual workspace.

At step 507, consumer computing device 130 may initiate a re-connection loop to re-connect to the virtual workspace by transmitting, to global server load balancer 111, a request to re-connect to the virtual workspace, wherein the request may comprise connection details from the cookie.

At step 508, consumer computing device 130 may determine whether access to the virtual workspace was restored (e.g., whether the server connection and/or network connection to the virtual workspace was restored, whether a new server connection and/or network connection to the virtual workspace was established with a different server pod and/or web server, or the like).

If, at step 508, consumer computing device 130 determines that access to the virtual workspace might not have been restored, then at step 509, consumer computing device 130 may receive (e.g., from web server 115a, or the like) a copy of an updated cookie comprising updated connection details associated with the virtual workspace. Consumer computing device 130 may also receive instructions to generate and transmit a revised re-connection request (e.g., based on the updated cookie, or the like).

At step 510, consumer computing device 130 may generate a revised re-connection request based on the updated connection details within the updated cookie (e.g., an updated unique identifier associated with an updated server pod assigned to host the virtual workspace, an updated unique identifier associated with an updated web server assigned to host the virtual workspace, or the like). Consumer computing device 130 may transmit the revised re-connection request to global server load balancer 111.

Consumer computing device 130 may continuously generate and transmit revised requests to re-connect to the virtual workspace based on receiving an updated cookie (e.g., for a pre-determined amount of time, until consumer computing device 130 receives access to the virtual workspace, or the like). In such instances, the process described herein may return to step 508 in that consumer computing device 130 may determine, based on transmitting a revised re-connection request, whether access to virtual workspace was restored.

However, if, at step 508, consumer computing device 130 determines that access to the virtual workspace may have been restored, then at step 511, consumer computing device 130 may receive access to the virtual workspace.

At step 512, consumer computing device 130 may receive a notification indicating termination of access to the virtual workspace (e.g., based on enterprise organization computing devices 120a-120c terminating access to the virtual workspace, based on the absences of enterprise organization computing devices 120a-120c within the virtual workspace, or the like). Based on receiving the notification, consumer computing device 130 may lose access to the virtual workspace.

As a result, the proposed solution may provide the following benefits: 1) real-time, or near real-time, monitoring of network capacity associated with a plurality of servers; 2) real-time, or near real-time, identification of a pod and/or a server within the pod with network capacity to host a server connection to a virtual workspace; 3) real-time, or near real-time, assignment of the virtual workspace to the identified pod and server; and 4) real-time, or near real-time, routing of subsequent requests to access the virtual workspace to the identified pod and server assigned to the virtual workspace.

As a result, the proposed solution may provide the following benefits: 1) real-time, or near real-time, reception of a cookie indicating server connection details associated with a virtual workspace; 2) real-time, or near real-time, transmission of a request to connect to a pod and server that host the virtual workspace; 3) real-time, or near real-time, reception of access to the virtual workspace; real-time, or near real-time, initiation of a re-connection loop based on receiving a notification indicating at least one of loss and/or termination of the server connection.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A method comprising:
   at a computing device including one or more processors and memory:
      receiving, from an enterprise organization computing device, a request to establish a server connection to host a virtual workspace;
      identifying a first web server, of a plurality of web servers, to host the server connection;
      transmitting the server connection request to the first web server;

establishing the server connection between the enterprise organization computing device and the first web server, wherein the establishing the server connection establishes the virtual workspace;

generating a cookie containing details that describe the server connection;

receiving, from a consumer computing device, a request to access the virtual workspace;

establishing at least one additional server connection between the consumer computing device and the first web server based on the details within the cookie;

receiving, from the first web server, a notification indicating the enterprise organization computing device lost network connection to the first web server;

querying the plurality of web servers to identify a second web server to host the server connection;

determining, based on parsing the cookie, whether the details within the cookie identify the second web server as the host of the server connection;

based on determining the details within the cookie do not identify the second web server as the host of the server connection:

determining whether the enterprise organization computing device is authorized to modify a host web server;

based on determining the enterprise organization computing device is authorized to modify the host web server, updating the details within the cookie;

transmitting an updated cookie to the consumer computing device; and based on determining the details within the cookie identify the second web server as the host of the server connection, re-establishing the server connection between the enterprise organization computing device and the second web server.

2. The method of claim 1, wherein the identifying the first web server to host the server connection comprises:

monitoring network traffic associated with each web server of the plurality of web servers; and determining, based on the monitoring, the first web server comprises network capacity to host the server connection.

3. The method of claim 1, wherein the details stored in the cookie comprise at least one of:

a unique identifier associated with a local server load balancer that hosts the first web server;

a unique identifier associated with a server pod comprising a subset of web servers, wherein the subset comprises at least the first web server that hosts the server connection; and a unique identifier associated with the first web server that hosts the server connection.

4. The method of claim 1, wherein the querying the plurality of web servers to identify the second web server comprises:

analyzing a volume of network traffic associated with each web server of the plurality of web servers;

comparing the volumes of network traffic to identify a web server with the least volume of network traffic; and determining the second web server is associated with the least volume of network traffic.

5. The method of claim 1, wherein the determining whether the details within the cookie identify the second web server as the host of the server connection further comprises:

parsing a database comprising unique identifiers associated with each web server of the plurality of web servers;

identifying a unique identifier associated with the second web server;

parsing the details within the cookie to identify a unique identifier associated with the first web server;

comparing the unique identifier associated with the first web server to the unique identifier associated with the second web server; and determining that the unique identifier associated with the first web server is the same as the unique identifier associated with the second web server.

6. The method of claim 1, further comprising, based on determining the enterprise organization computing device is not authorized to modify the host web server, rejecting the server connection between the enterprise organization computing device and the second web server.

7. The method of claim 1, further comprising, based on determining the enterprise organization computing device is authorized to modify the host web server, establishing the server connection between the enterprise organization computing device and the second web server.

8. The method of claim 1, wherein the updated cookie may comprise at least one of:

an updated unique identifier associated with a local server load balancer that hosts the second web server;

an updated unique identifier associated with a server pod comprising a subset of web servers, wherein the subset comprises at least the second web server that hosts the server connection; and an updated unique identifier associated with the second web server.

9. The method of claim 1, further comprising, based on receiving the notification indicating the enterprise organization computing device lost network connection to the first web server, determining an amount of time during which the enterprise organization computing device was disconnected from the first web server.

10. The method of claim 9, further comprising determining whether the amount of time is greater than a timeout threshold value.

11. The method of claim 10, further comprising, based on determining the amount of time is less than the timeout threshold value, monitoring the server connection to determine whether the enterprise organization computing device connects to the second web server.

12. The method of claim 10, further comprising, based on determining the amount of time is greater than the timeout threshold value:

terminating the server connection between the enterprise organization computing device and the first web server;

transmitting, to the enterprise organization computing device, a notification indicating:

access to the virtual workspace is terminated, and a second request to establish a second web server connection is needed to host a second virtual workspace; and transmitting, to the consumer computing device, a notification indicating access to the virtual workspace is terminated.

13. A computing platform comprising:

at least one processor;

a communication interface communicatively coupled to the at least one processor; and memory storing computer-readable instructions that, when executed by the at least one processor, cause the computing platform to:
  receive, from an enterprise organization computing device, a request to establish a server connection to host a virtual workspace;
  identify a first web server, of a plurality of web servers, to host the server connection;
  transmit the server connection request to the first web server;
  establish the server connection between the enterprise organization computing device and the first web server, wherein the establishing the server connection establishes the virtual workspace;
  generate a cookie containing details that describe the server connection;
  receive, from a consumer computing device, a request to access the virtual workspace;
  establish at least one additional server connection between the consumer computing device and the first web server based on the details within the cookie;
  receive, from the first web server, a notification indicating the enterprise organization computing device lost network connection to the first web server;
  query the plurality of web servers to identify a second web server to host the server connection;
  determine, based on parsing the cookie, whether the details within the cookie identify the second web server as the host of the server connection;
  based on determining the details within the cookie do not identify the second web server as the host of the server connection:
    determine whether the enterprise organization computing device is authorized to modify a host web server;
    based on determining the enterprise organization computing device is authorized to modify the host web server, update the details within the cookie;
    transmit an updated cookie to the consumer computing device; and
    based on determining the details within the cookie identify the second web server as the host of the server connection, re-establishing the server connection between the enterprise organization computing device and the second web server.

14. The computing platform of claim 13, wherein the identifying the first web server to host the server connection further causes the computing platform to:
  monitor network traffic associated with each web server of the plurality of web servers; and
  determine, based on the monitoring, the first web server comprises network capacity to host the server connection.

15. The computing platform of claim 13, wherein the details stored in the cookie comprise at least one of:
  a unique identifier associated with a local server load balancer that hosts the first web server;
  a unique identifier associated with a server pod comprising a subset of web servers, wherein the subset comprises at least the first web server that hosts the server connection; and
  a unique identifier associated with the first web server that hosts the server connection.

16. The computing platform of claim 13, wherein the querying the plurality of web servers to identify the second web server further causes the computing platform to:
  analyze a volume of network traffic associated with each web server of the plurality of web servers;
  compare the volumes of network traffic to identify a web server with the least volume of network traffic; and
  determine the second web server is associated with the least volume of network traffic.

17. One or more non-transitory computer-readable media storing instructions that, when executed by a computing platform comprising at least one processor, memory, and a communication interface, cause the computing platform to:
  receive, from an enterprise organization computing device, a request to establish a server connection to host a virtual workspace;
  identify a first web server, of a plurality of web servers, to host the server connection;
  transmit the server connection request to the first web server;
  establish the server connection between the enterprise organization computing device and the first web server, wherein the establishing the server connection establishes the virtual workspace;
  generate a cookie containing details that describe the server connection;
  receive, from a consumer computing device, a request to access the virtual workspace;
  establish at least one additional server connection between the consumer computing device and the first web server based on the details within the cookie;
  receive, from the first web server, a notification indicating the enterprise organization computing device lost network connection to the first web server;
  query the plurality of web servers to identify a second web server to host the server connection;
  determine, based on parsing the cookie, whether the details within the cookie identify the second web server as the host of the server connection;
  based on determining the details within the cookie do not identify the second web server as the host of the server connection:
    determine whether the enterprise organization computing device is authorized to modify a host web server;
    based on determining the enterprise organization computing device is authorized to modify the host web server, update the details within the cookie;
    transmit an updated cookie to the consumer computing device; and
  based on determining the details within the cookie identify the second web server as the host of the server connection, re-establishing the server connection between the enterprise organization computing device and the second web server.

18. The non-transitory computer-readable media of claim 17, wherein the instructions, when executed, further cause the computing platform to, based on receiving the notification indicating the enterprise organization computing device lost network connection to the first web server, determine an amount of time during which the enterprise organization computing device was disconnected from the first web server.

19. The non-transitory computer-readable media of claim 18, wherein the instructions, when executed, further cause the computing platform to determine whether the amount of time is greater than a timeout threshold value.

* * * * *